United States Patent [19]

McClenahan et al.

[11] 4,156,930
[45] May 29, 1979

[54] MULTIPOINT RECORDER WITH RANDOMLY ADDRESSABLE INPUT SWITCHING AND PRINTING MEANS

[75] Inventors: Robert W. McClenahan, Philadelphia; James W. Zecca, Telford, both of Pa.

[73] Assignee: Leeds & Northrup Company, North Wales, Pa.

[21] Appl. No.: 815,106

[22] Filed: Jul. 13, 1977

[51] Int. Cl.² .............................................. G06F 3/12
[52] U.S. Cl. ..................................... 364/900; 346/34
[58] Field of Search ............... 364/900 MS File, 200; 346/34, 76 R, 62; 235/92 MP, 92 EA

[56] References Cited

U.S. PATENT DOCUMENTS 3,576,582  4/1971  Smith ....................................... 346/34
3,665,414  5/1972  Hutch et al. ............................. 346/34
3,683,404  8/1972  Dennis et al. ........................... 346/34
3,949,408  4/1976  Mason et al. ............................ 346/34

*Primary Examiner*—Joseph M. Thesz
*Attorney, Agent, or Firm*—William G. Miller, Jr.; Raymond F. MacKay

[57] ABSTRACT

A multipoint recorder having a counter for producing sequential address signals for sequential selection by randomly addressable input switching means and recording by randomly addressable recording means. A randomly addressable visual display indicating the point being recorded is also connected to the common bus output of the counter. This provides a recorder in which no circuit or mechanical means is required solely to provide synchronization of the input switching means, the recording means and the visual display.

11 Claims, 14 Drawing Figures

MULTIPOINT RECORDER WITH RANDOMLY ADDRESSABLE INPUT SWITCHING AND PRINTING MEANS

BACKGROUND OF THE INVENTION:

This invention relates to recorders and more particularly to an improved multipoint recorder which utilizes digital circuitry for providing inherent synchronization of the measuring and printing of the magnitude along with an identifying indicia of any of a plurality of inputs and where desired a simultaneous visual display of an indicia identifying the input being measured.

Heretofore, multipoint recorders of the type which utilize a measuring system operable to position a printing element along a chart so that the position is representative of the magnitude of the unknown signal being measured and then print at that position an indicia identifying the unknown signal and its magnitude, have required means to be provided for synchronizing the switching of the input circuits and the printing of the indicia indicating the particular input being measured. Prior art apparatus utilizing different synchronization techniques are disclosed in U.S. Pat. Nos. 3,665,414 issued to Hutch et al. on May 23, 1972 and 3,683,404 issued to Dennis et al. on Aug. 8, 1972. Neither of the above mentioned patents show a multipoint recorder arrangement having a randomly addressable input switching means and a randomly addressable printing means responding to the same point address signals and therefore both require specific circuitry and mechanisms designed solely for the synchronization of the switching of the input and the operation of the printing mechanism so that the printing mechanism will identify with an appropriate numeral, the particular input being recorded at each interval.

It is an object of the present invention to provide an improved multipoint recorder wherein no such synchronizing circuit or mechanical means is required to maintain a synchronization or a coordination of the printing means and the input selecting means.

It is another object of the present invention to provide an improved multipoint recorder wherein a visual display of the point number being recorded can also be incorporated without the necessity of any special synchronization circuits or mechanical devices for synchronization.

SUMMARY OF THE INVENTION:

To accomplish the objects of the present invention, there is provided a method for controlling the measurement and recording of the magnitude of a plurality of unknown signals by a multipoint recorder of the type utilizing a balanceable measuring system operable to position a printing element along a chart so that the position is representative of the magnitude of the unknown signal being measured and to then print at said position indicia identifying the unknown signal and magnitude. The method comprises the steps which include the production of sequential address signals identifying the unknown signals to be measured. The measuring system is then connected to a corresponding one of the unknown signals in response to the address signals. The printing element is actuated in response to the address signals after the measuring system has positioned the printing element in a position corresponding to the magnitude of the addressed unknown signal so as to identify the addressed unknown signal and indicates its magnitude by recording on the chart corresponding indicia. To carry out this method there is provided a first addressable means for selectively connecting the unknown signal addressed to the measuring system as well as a second addressable means for selectively operating the printing element to print the indicia corresponding to the unknown signal addressed when the balanceable measuring system has positioned the printing element, and there is also provided means for simultaneously addressing the first and second addressable means with sequentially produced address signals identifying the unknown signals to be measured.

Figure 1:
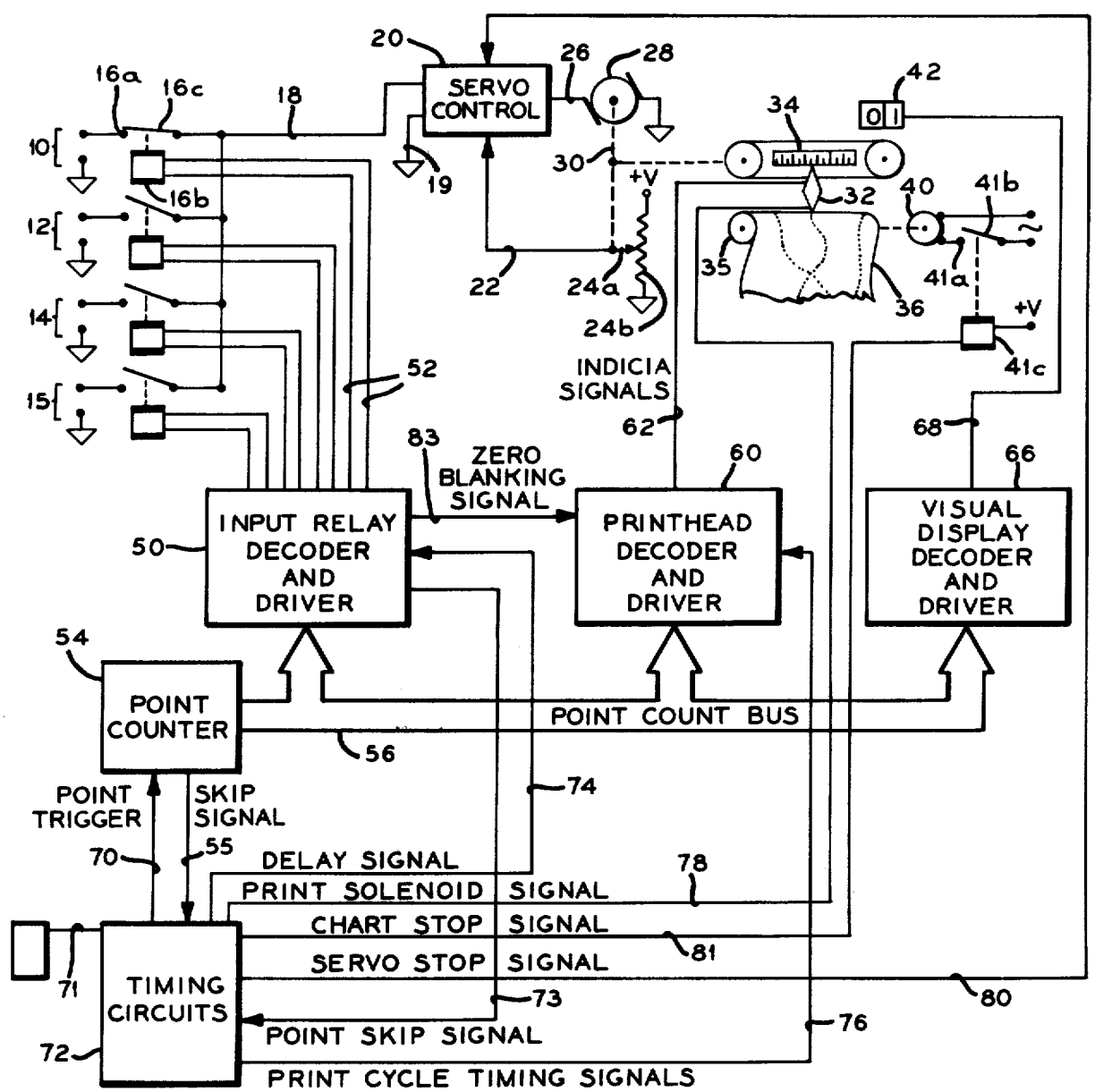
FIG. 1 is a block diagram of the overall system for multipoint recording.

DESCRIPTION OF THE PREFERRED EMBODIMENT:

Referring to FIG. 1, there is shown the terminal pairs 10, 12, 14 and 15 at which there are connected different inputs which are to be measured and recorded. One of the terminals of each pair is connected to circuit common while the other terminal is connected to one contact of an input relay. The circuit common may or may not be earth ground, as shown in FIG. 1, depending on the application of the instrument. If it is not grounded, then an additional relay contact is required on each input relay to switch the second side of the input. For example, the input at the terminal pair 10 is connected to the contact 16a which is connected to input line 18 upon actuation of the relay actuator 16b to close contact 16c of the relay and make the connection to line 18, as shown in FIG. 1. Each of the other input terminal pairs 12, 14 and 15 is similarly associated with an input relay which can be selectively actuated from the open position shown to apply that input to line 18. While only four inputs are shown in FIG. 1, the circuit diagrams provided in the subsequent figures describes an embodiment capable of measuring 30 inputs as an example of one form that this invention may take.

As shown in FIG. 1, line 18 provides one input to the servo control 20 which has another input supplied from line 22 which is connected to the contact 24a of the potentiometer slide-wire 24b. The potentiometer is provided for supplying an input to the servo control 20 which will oppose and therefore balance out the input supplied on line 18. As shown, the potentiometer is supplied with a potential supply +V at one end of the slide-wire 24b while the other end is connected to ground. The servo control is connected by way of line 26 to the DC motor 28 which has its other connection to circuit common. The motor 28 has its rotating shaft 30 connected to operate the contact 24a along slidewire 24b and to simultaneously move the printing element 32 along the indicating scale 34 of the multipoint recorder so that the printing element or printhead 32 can print on the motor-driven chart 36 which is driven at a predetermined constant speed over chart roll 35. Thus, the servo control in conjunction with the motor 28 and slidewire 24b form a balanceable measuring circuit or system. The printhead may advantageously be a thermal printhead of the construction set forth in U.S. Pat. No. 3,989,917, which can be designed to print any selected numerals and a dot on heat sensitive chart paper. The printhead may, for example, be brought into engagement with the chart by means of a solenoid designed to so position the printhead. The motor 40 is shown connected to an AC supply through a fixed relay contact 41a when it is connected to movable contact 41b upon energization of relay actuator 41c. There is then produced on the chart 36 a record of the value of each of the inputs selected for recording. The multipoint recorder of FIG. 1 is also shown as having a visual display 42 which is shown having two digits for the purposes of visually identifying the number of the point being printed at the particular time the display is viewed.

It is, of course, necessary that the particular input signal being measured be properly identified by the printing on the chart 36 as produced by printing element 32 as well as by the visual display 42. Thus, there must be a synchronization between the actuation of the input relays which selectively connect the input line 18 to the terminal pairs 10, 12, 14 and 15 with the printing of the indicia by the printing element 32 and with the visual display of the indicia.

With the system shown in FIG. 1, no specific mechanical or electrical circuitry is required for the sole purpose of effecting a synchronization of the various elements of the recorder, that is the input switching, the printing and the visual indication. Instead, the synchronization of these elements is inherent in the novel organization of the circuit as will be evident from the more detailed explanation to follow.

The system of FIG. 1 is made up of a number of basic elements. Each of the elements to be synchronized is randomly addressable. That is, the input relays are randomly addressable as is the printing means and the visual display means. The input relays are actuated by the output of the input relay decoder and driver 50, a separate pair of lines being shown providing the output from unit 50 to each of the separate relay actuators. For example, the lines 52 are connected to relay actuator 16b for closing that relay and providing a connection between the input terminal pair 10 and input line 18.

The input relay decoder and driver 50 receives as its input the coded signals appearing on the point count bus 56 which use a binary decimal coding as produced by the point counter 54. The bus 56 also provides inputs to the printhead decoder and driver 60 which in turn provide the signals on lines represented by line 62 to the printhead 32 to set up the circuits for the thermal printing on the chart 36 of an appropriate indication of the number of the points being measured when a solenoid associated with the printhead 32 is energized. The particular position on the chart at which the printing takes place is representative of the magnitude of the signal being measured. That particular position is normally represented by a dot which along with the associated point number (when printed) forms the indicia for that point.

The point count bus 56 also provides input signals to the visual display decoder and driver 66 which then provides over lines represented by line 68 input signals to the visual display 42 causing it to indicate a numerical point number being recorded by the printhead 32. It is necessary, of course, to provide timing for certain of the elements of the circuit of FIG. 1 for reasons that will become more obvious in the explanation to follow. The timing circuits supplied by a.c. power from line 71 include the input to the point counter 54 of a point trigger signal which is produced on line 70 and which operates to advance the point counter. The point counter returns a phantom point skip signal on line 55 to the timing circuits to provide for skipping a fake point whose use will be discussed further in the subsequent description. The timing circuits 72 also produce a delay signal over line 74 to the input relay decoder and driver 50. That delay signal is utilized to delay the actuation of the input relays to take into account the delay necessary in the measurement of the input to accommodate for any contact bounce on the relays switching the inputs and to delay the connection of the relays so that there is a guarantee of a break-before-make action of the input relays. The relay decoder and driver 50 provides for timing circuits 72 and a point skip signal on line 73 which indicates the points selected to be skipped in the recording cycle.

A further timing signal, namely a print solenoid signal, is supplied over line 78 to the printhead to energize a solenoid arranged to operate the printhead 32 so it will be brought in contact with the chart 36 in preparation for printing the indicia set on the printhead by the signals on cable 62 from the printhead decoder and drive means 60. The printing sequence as to the timing of the signals on cable 62 is timed by the print cycle timing signal provided by timing circuits 72 on cable 76 to the printhead decoder and driver as supplemented by the zero blanking signal supplied by way of line 83 from the input relay decoder and driver 50. Also, a servo stop signal is supplied over line 80 to the servo control 20 for effectively stopping the operation of the servo motor 28 so that when printing occurs in response to the signal on cable 62 the printhead will not be in motion across the chart and a clear printing can be effected. The timing circuits 72 also provide a signal on line 81 to relay actuator 41c to provide for disconnection of contacts 41a and 41b to stop the transport of chart 36 when only an indication without recording is required for points being measured.

It will thus be evident that the timing circuits 72 which are supplied from a half wave rectified a.c. power supply 69 over line 71 is effective to send a trigger signal over line 70 to point counter 54 for stepping the point counter 54 so that it sequentially supplies over point count bus 56 signals coded to indicate in consecutive order points to be recorded by the recorder. The coding on the point count bus is simultaneously decoded by the input relay decoder and driver 50, the printhead decoder and driver 60, and the visual display decoder and driver 66 so that the appropriate input relay can be selected with a corresponding number being selected on the printhead by the signal on cable 62 and a similar number being displayed by the visual display 42.

The servo stop signal on line 80 is effective to maintain the motor 28 at a standstill during the initial portion of the period between selection of sequential inputs so as to provide an allowance for any contact bounce which may occur as a result of the pull-in of a relay. When the initial period after the pull-in of a relay is over, the servo stop signal on line 80 disappears and the measuring circuit is free to operate the motor 28 by way of the servo control so as to balance the circuit and position the printing element 32 along the scale 34 in accordance with the magnitude of the input being measured. After sufficient balancing time has been allowed, there is provided a signal over line 78 which will initiate printing of the number selected depending upon the coding on the point count bus 56 and the printing occurs. At the same time, of course, the visual display 42 exhibits the number of the point being measured and printed.

Figure 1A:
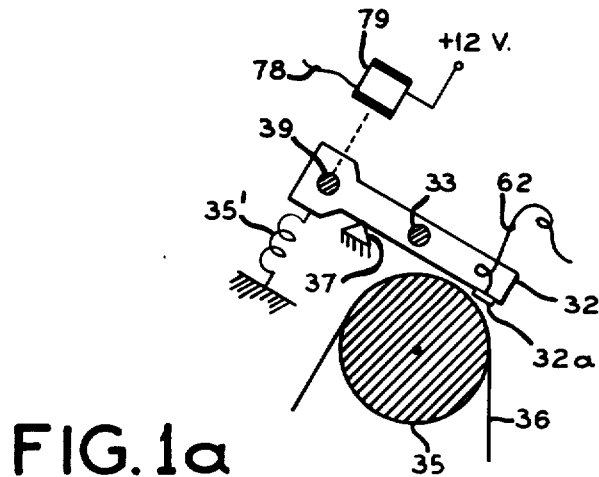
FIG. 1a is a cross-section view of the printhead mounting for the recorder of FIG. 1.

In FIG. 1a there is shown a cross-section view of a simplified form of a printhead mounting and actuating system. In the arrangement shown the printhead 32 has an area 32a which contains the thermal printing characters and the dot which are energized by signals on lines represented by cable 62 to print the selected characters and the dot on the chart paper 36 as it is being transported over chart roll 35. The printing occurs after the solenoid 79 is energized by a signal on line 78 from the timing circuits 72 (FIG. 1). Energization of the solenoid 79 causes the shaft 39 to be moved so as to pivot the head 32 about shaft 33 which like shaft 39 carries the head 32 as it is moved across the chart. The spring 35' tends to maintain the head 32 against the stop 37 when solenoid 79 is not energized, and in that position the area 32a is out of contact with the chart 36.

Figure 2:
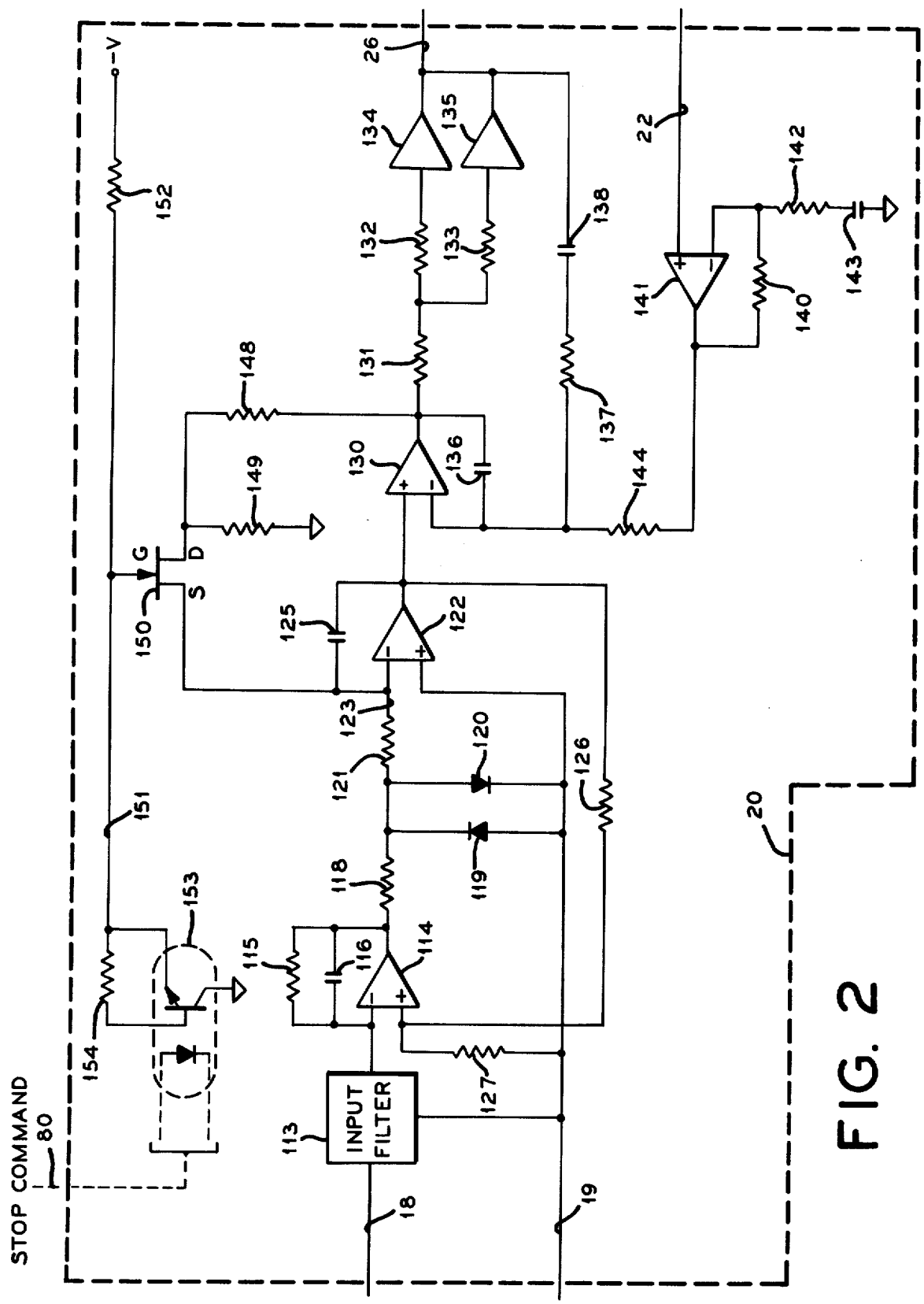
FIG. 2 is a schematic diagram of the servo control of the recorder of FIG. 1.

In FIG. 2 there is shown one form which the circuit of the servo control 20 of FIG. 1 can take. The unknown signal being measured is connected by way of lines 18 and 19 to the input terminals of the low pass input filter 113 to remove any undesired signals that may be applied to the input terminals by electromagnetic pickup and which are not related to the input signal applied to the input terminals 10, 12 or 14 of FIG. 1. Generally, such signals are picked up from power supply lines and are at that frequency or multiples thereof. The filtered input signal is then applied to the inverting input of a differential comparator amplifier 114. Shown connected in a negative feedback connection from the output of the comparator amplifier are a resistor 115 and a capacitor 116 to provide a negative feedback around the differential amplifier 114. This negative feedback serves to stabilize the circuit against high frequency oscillations which if not eliminated would result in the servo system having a deadband because the high frequency signal would tend to saturate the input stage of amplifier 114.

The output from comparator amplifier 114 is applied by way of a resistor 118 to a pair of diodes 119 and 120 connected in back-to-back relation. These diodes serve as a bidirectional limiter to limit the voltage between the output of resistor 118 and circuit common to the magnitude of the voltage necessary to produce conduction in the diodes, which is approximately 0.6 volts. This limited voltage is applied to an integrating circuit consisting of an integrating resistor 121, a differential amplifier 122 and an integrating capacitor 125. The output from the integrating amplifier 122 is fed back to the non-inverting input of the comparator amplifier 114 through a divider network comprised of resistors 126 and 127 which together determine the gain of the input signal amplifying channel which includes comparator amplifier 114 and integrating amplifier 122.

The circuit of FIG. 2 thus far described in an input signal integrating amplifying loop which will upon application of a signal voltage to input lines 18 and 19 drive comparator amplifier 114 to saturation to cause one or the other of diodes 119 and 120 to conduct and produce across them a voltage limited to the diode conduction voltage. This fixed voltage produces at the output of integrating amplifier 122 a ramp type voltage change that increases with time until the voltage at the output of integrating amplifier 122 reduced by the resistors 126 and 127 and applied to the non-inverting input terminal of differential comparator amplifier 114 is equal in magnitude to the input signal at the inverting input of amplifier 114. At that time the input channel is restored to a balanced condition and the output from integrating amplifier 122 is proportional in magnitude to the input signal.

It will be obvious to those skilled in the art that the overall gain of the input amplifying channel is determined by the relative magnitude of the resistors 126 and 127 and may be changed by varying the relative resistances of these resistors. Also, the magnitude of resistor 121 may be adjusted or preselected to predetermine the rate of change of the signal at the output of integrating amplifier 122 and in turn the rebalancing speed of the servo motor 28 (FIG. 1).

The output voltage from integrating amplifier 122 is applied to the non-inverting input of differential error amplifier 130. The output from error amplifier 130 is applied through resistors 131, 132 and 133 to power amplifiers 134 and 135, respectively, whose outputs are connected to control the operation of servo motor 28. One power amplifier is used to provide energization of the servo motor for rotation in one direction while the other power amplifier is used for control of rotation in the opposite direction. It is to be understood, of course, that if error amplifier 130 has sufficient power gain that the power amplifiers 134 and 135 need not be used.

As shown, a capacitor 136 is connected in a negative feedback circuit from the output of differential error amplifier 130 to its inverting input terminal. This capacitor 136 provides error amplifier 130 stability over a wide range variation in the amount of gear back lash between the servo motor 28 (FIG. 1) and measuring slidewire 24b (FIG. 1). Also connected to the inverting input of differential amplifier 130 are resistor 137 and capacitor 138 to provide a negative feedback path from the servo motor to improve the damping of the servo system without creating a deadband by reducing the gain of the motor control loop composed of amplifiers 130, 134 and 135 during balancing time and allowing the gain to be very high at balance.

The voltage developed at contact 24a (FIG. 1) is applied to the non-inverting input of a differential slidewire buffer amplifier 141 which has a gain of unity by virtue of the feedback connection from its output to inverting input terminal by resistor 140. Additionally, the inverting input of amplifier 141 is connected to circuit common through resistor 142 and capacitor 143 to provide a lead signal to the feedback signal for damping of the servo motor 28 (FIG. 1). The output from amplifier 141 is applied through resistor 144 to the inverting input of differential error amplifier 130 to complete the rebalanceable motor control loop.

The rebalanceable servo system as described responds to a change in input signal to develop a ramp type voltage at the non-inverting input of error amplifier 130 which in turn energizes the servo motor. The servo motor in response to the ramp signal applied to the error amplifier positions its contact to produce through slidewire buffer amplifier 141 a rebalancing signal at the inverting input of differential amplifier 130. The rate at which the servo motor adjusts the contact 24a is determined by the rate of change of the signal applied to the error amplifier 130 by the integrating amplifier 122. The integrating resistor 121 therefore determines the speed at which the servo motor operates. As described, the servo system is comprised of two separately rebalanceable loops connected with the output signal from the input signal integrating amplifying loop serving as the input signal to the rebalanceable motor control loop.

It is desirable to interrupt the rebalancing operation in the multipoint recorder at the time that the magnitude of the value of the signal for any particular point is being recorded. While there are many different ways which can be employed to provide a servo stop signal to stop the balancing operation of a servo system, it is particularly desirable in recorder applications that during the time that the recorder is stopped, the circuit is held in such a state that when the recorder is again permitted to proceed in its rebalancing mode of operation that it does so without an excessive rate of travel and in the proper direction.

The circuit used in this embodiment of the invention to stop the rebalancing operation of the servo system comprises a negative feedback path from the output from error amplifier 130 to input summing junction 123 of integrating amplifier 122. The establishment of the negative feedback path so reduces the system gain that the output from the error amplifier 130 will not be sufficient to produce operation of the servo motor. While the negative feedback circuit may take many different forms, the circuit, as shown in FIG. 2, is comprised of a resistor 148 and a resistor 149 connected in series circuit. The junction between the two resistors is connected through the source-drain circuit of a switching FET 150 to the summing junction 123 of the integrating amplifier 122. The operation of the switching FET 150 is under control of a stop signal supplied over line 151 from optical isolator 153 and its associated resistor 154. The signal from the optical isolator is supplied from lines indicated as 80 in FIG. 1. The manner in which those stop signals are generated is described subsequently. During the time that stop signal is not present, there is applied to the gate electrode of switching FET 150 a negative voltage from the voltage source identified as −V through the resistor 152. This voltage will maintain the switching FET in its high resistance state between its source and drain electrodes so that the negative feedback path from the output of error amplifier 130 to integrating amplifier 122 is interrupted.

When it is desired to stop the rebalancing operation of the servo system, the stop signal is generated on line 151 so that the gate electrode of switching FET 150 is grounded. The grounding of the gate electrode produces a low impedance path between the source and drain electrodes of switching transistor 150 to provide the negative feedback path from the output of error amplifier 130 to the summing junction 123 of integrating amplifier 122 to stop the rebalancing operation of the recorder during the time that the stop signal is present on line 151.

In addition to producing a low voltage at the output of error amplifier 130, the negative feedback path also maintains a fixed voltage across the integrating capacitor 125 of integrating amplifier 122, and thus retains a fixed output voltage from the integrating amplifier 122. It is by virtue of this maintaining of the fixed voltage when the stop signal is not present on line 151 to restore the rebalanceable positional servo system to normal operation, that the servo motor rebalancing rate is limited by the integrating amplifier 122 to whatever speed of rebalance is desired and established by the magnitude of the resistor 121. For recording operations particularly, this is desirable in order to prevent overshoot of the recorder pen position.

Assuming that the servo system is at rest in a balanced condition, both the output of error amplifier 130 and the summing junction 123 at the input to integrating amplifier 122 will be at substantially ground potential. Under these conditions the presence of a stop signal on line 151 will have no influence upon the system. Also, if no change occurs in the signal applied to input terminals from leads 18 and 19 during the time that stop signal is present on line 151, there will be no change in the servo system when the line 51 is opened.

On the other hand, if while the stop signal is present on 151, the signal applied to input terminals 18 and 19 should change, a signal voltage will appear across the signal limiting diodes 119, 120. This signal applied to resistor 121 will tend to change the voltage at the summing junction 123 of integrating amplifier 122. Such a change in voltage will be amplified by integrating amplifier 122 and error amplifier 130 and applied in a negative feedback sense to restore the summing junction 123 to substantially ground potential. Because of the high gain in amplifiers 122 and 130 and the large amount of negative feedback, the change in voltage necessary at the output of amplifier 130 to restore the input of amplifier 122 to ground potential is not large enough to cause motor 28 (FIG. 1) to operate. As previously stated, this feedback action maintains a substantially fixed voltage on integrating capacitor 125 throughout the time that stop signal is present on line 151.

If the stop signal is not present on line 151 at the time that an unbalanced condition exists in the input rebalanceable loop circuit, i.e. the signal applied to the inverting input of amplifier 114 not equal in magnitude to the signal applied to the non-inverting input, the integrating amplifier 122 resumes its normal integrating action and its output begins to change in a ramp fashion at a rate determined by the magnitude of the resistor 121. The error amplifier 130 in response to the ramp signal applied to its non-inverting input will produce energization of the servo motor to produce a rebalancing action in the servo loop such that the rebalancing speed of the servo motor is determined by the rate of change of signal output from integrating amplifier 122 in avoidance of any abrupt change in position of the servo motor.

In the logic diagram of FIG. 2 and the subsequent logic diagrams there are shown inverters, NAND gates, and NOR gates using both positive and negative logic in the standard symbology. Other digital circuits are shown in block form and identified as to their function and the commercially available components which can be used. In connection with the logic blocks, the numbers outside the symbols identify the appropriate pin or terminal of the commercial unit while the numbers or letters within the blocks identify the particular output or input as is done in the art.

In the description of the logic circuits, the logic components are identified by the designation used to label them in the drawings with the addition of the number of one of the output terminals. Thus, gate U46-10 is the NAND gate identified in FIG. 3 as U46 and is specifically that gate U46 of the four gates of the CMOS device 4011B which has its output pin labeled 10 as distinguished from the other NAND gates of the device U46 whose output pins are identified by the numbers 3, 4 and 11, respectively. Thus, U46-10 is only part of the QUAD 2-INPUT NAND GATE 4011B which is, for example, identified by Motorola as MC14011B.

In the diagram of FIG. 1 the signal lines are identified by reference characters which in some cases identify individual lines or a plurality of lines in a cable where those lines all carry signals having the purpose of accomplishing a particular function in the system of the recorder. In the subsequent figures which show details of parts of the system of FIG. 1, the lines representing wires or cables which connect elements of the circuit in one drawing to elements of the circuit in one or more other drawings are identified by a number which indicates the drawing number having the circuit from which the signal that is carried by that line originates. Where a drawing shows a circuit which produces more than one signal used in circuits shown in other drawings, the connecting lines are identified by the number of the drawing as mentioned plus a letter to differentiate each line from the others. Where a line is also one of those identified in FIG. 1, that identifying reference character is added in parenthesis.

Figure 3:
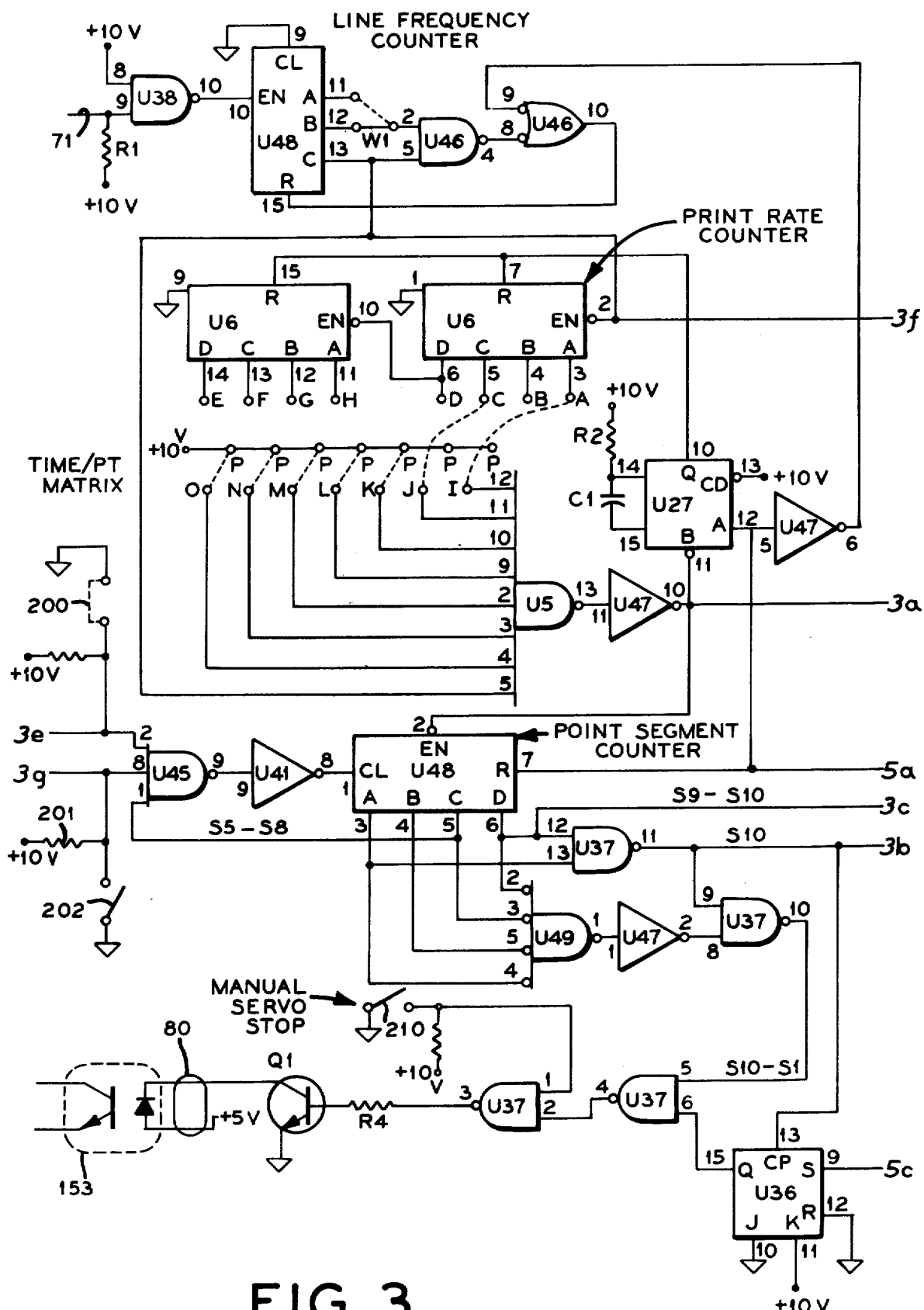
FIG. 3 is a logic diagram of a part of the timing circuit of the recorder of FIG. 1.

FIG. 3 shows the basic timing circuit for the multipoint recorder of this invention. All timing is derived from the AC line 71. Thus, line frequency is introduced on line 71 to terminal 9 of a pulse-shaping gate U38-10. It will be noted that terminal 9 is also connected through resistor R1 to a voltage source providing +10 volts.

In the timing circuits of FIG. 3, there are three successive stages of counting from the basic line frequency. These successive stages include a line frequency counter, print rate counter and point segment counter.

The line frequency counter U48-11 outputs a constant string of pulses at a rate of 10 per second with either a 50 hertz or a 60 hertz input from gate U38-10. The output is at terminal 3f and the count derived from U48-11 is shown in the following truth table:

| D | C | B | A | |
|---|---|---|---|---|
| 0 | 0 | 0 | 0 | |
| 0 | 0 | 0 | 1 | |
| 0 | 0 | 1 | 0 | |
| 0 | 0 | 1 | 1 | |
| 0 | 1 | 0 | 0 | |
| 0 | 1 | 0 | 1 | Reset state 50 Hz |
| 0 | 1 | 1 | 0 | Reset state 60 Hz |

As will be noted from the above truth table, the output from terminal 14, namely the D output, is always zero; therefore, there is no connection to terminal 14.

If the input is a 50 hertz input, the connecting jumper W1 is in the 1-2 position shown as a dotted line which causes the counter to reset after five counts, whereas if the input is a 60 hertz input, the W1 is in the 2-3 position shown in solid line which causes the counter to reset after six counts. Thus, the output of the C line, namely from terminal 13 of U48-11 is ten pulses per second in either case. The other input of U46-4 at terminal 5 is derived from the C line, namely from terminal 13 at U48-11. The reset circuit for the line frequency counter is completed by gate U46-10 which has its terminal 8 connected to the output of U46-4 and its other input, at terminal 9, connected from the output of the complementer U47-6. Thus, the gate U46-10 produces from its output a reset signal for U48-11.

The print rate counter determines the time per point of the recorder. Its output can be varied as needed by moving jumpers in a matrix which may be called the time per point matrix. The print rate counter utilizes a straight binary counter U6 which is capable of counting to 256. It is reset, however, before it reaches that point. The reset is determined by U5-13. The inputs to U5-13 are connected from the various outputs of U6 as determined by the time per point matrix. Thus, for example, as shown in the time per point matrix, terminal 3 provides the A output of U6 and terminal 5 provides the C output from U6 which outputs are connected by jumpers to terminals 12 and 11 respectively on the input of U5-13. All inputs of U5-13 which are not jumpered to outputs of U6, except for terminal 5, are connected to one of the P terminals of a bus shown as being connected to a source of voltage, namely +10 volts. With the connections shown in the time per point matrix, the print rate is six seconds per point. Other print rates may, of course, be obtained by making other connections between the print rate counter and the inputs to the gate U5-13 as long as the inputs of U5-13 which are not connected to the outputs of the counter U6 are connected to the +10 volt source at the terminals P.

The reset of the print rate counter occurs when all inputs are high on U5-13, for then the one-shot U27-10 is fired and a pulse appears on the reset terminals 7 and 15 of the print rate counter U6 from the output of U27-10. The input to terminal 11 of U27-10 is provided from an inverter U47-10 whose input is derived from the output of gate U5-13, as shown in FIG. 3. The input to terminal A of U27-10 is from line 5a, the manual advance reset line, which also provides an input to the inverter U47-6 which then supplies the input at terminal 9 of U46-10 to provide the reset signal for U48-11.

With regard to the print rate counter, it will be noted that if all of the inputs of U5-13 are tied to +10 volts, there is still one input line (U5-13, terminal 5) bypassing the counter U6 since it is connected to terminal 13 of U48-11 of the line frequency counter which means that it receives ten pulses per second. With such connections the print rate counter is reset every point and is always at zero, thus the output of U47-10 would be the same ten pulses per second as the output of the line frequency counter. Of course, if several inputs of U5-13 are tied to outputs of counter U6, the counter will reach a higher number before resetting and the output of U47-10 will be a lower rate of pulses. The line to terminal 5 of U5-13 also acts as strobe so that the output pulse is always of the same duration. It should be noted that the rate of the output of U47-10 is not the actual time per point but 1/10 of that time. This output signal is supplied to other circuits over line 3a.

The circuit of FIG. 3 also, as noted above, provides a point segment counter which devides each measurement point time into ten equal segments which are designated as segments S1 through S10. A binary coded decimal counter U48-3 counts the output of the print rate counter from U47-10. It makes one complete cycle (zero to 9) for every ten input pulses. This corresponds to a complete point measurement cycle. The truth table for this counter is as follows:

| D | C | B | A | SEGMENT |
|---|---|---|---|---------|
| 0 | 0 | 0 | 0 | S1 |
| 0 | 0 | 1 | 1 | S2 |
| 0 | 0 | 1 | 0 | S3 |
| 0 | 0 | 1 | 1 | S4 |
| 0 | 1 | 0 | 0 | S5 |
| 0 | 1 | 0 | 1 | S6 |
| 0 | 1 | 1 | 0 | S7 |
| 0 | 1 | 1 | 1 | S8 |
| 1 | 0 | 0 | 0 | S9 |
| 1 | 0 | 0 | 1 | S10 |

The various states of this counter are coded off for use in timing of different actions to be taken, as will be further explained in subsequent descriptions. For example, U37-11 forms a signal for establishing the duration of segment S10. That signal appears on line 3b and is used for timing the printing as noted from FIG. 3. The gate U37-11 is connected to the output terminals 3 and 6 of U48-3 at its input terminals 13 and 12, respectively.

A gate U49-1 is utilized to form a signal during the segment S1. As shown, the inputs to U49-1 are from all of the output terminals (3, 4, 5 and 6) of U48-3 while the output of U49-1 provides an input to the inverter U47-2 which in turn supplies an input at terminal 8 of U37-10. The gate U37-10 has its other input at terminal 9 from the output of gate U37-11 so that the output of gate U37-10 is a signal during both segments S1 and S10. Those signals from the output of U37-10 provides one of the inputs to gate U37-4.

The output of terminals 6 of U48-3 is a signal during the segments S9 and S10 and is used to control the print solenoid as therefore provided as an output on line 3c.

A manual advance function is provided for the recorder as will be described in connection with the circuits of other Figures. When the point selection is manually advanced, it is, of course, necessary to reset all of the counters as an initial step so that the full sequence of segments are timed out and the corresponding recorder functions timed for those segments performed. The reset signal appears on line 5a and causes all three counters to reset to their zero state.

The gate U45-9 controls a print on command function of the recorder. As shown, U45-9 terminal 2 is normally grounded through jumper 200 while terminal 8 and line 3g are normally high when switch 202 is open due to the +10 volt supply to resistor 201 which connects to terminal 8. When U45-9 is in this state, it has no effect and U48-3 runs normally. If, however, terminal 2 goes high as when jumper 200 is removed, U48-9 is controlled by the C output of U48-3. When U48-3 goes high at terminal 5 (which is at the beginning of the S5 segment), terminal 1 of U48-3 is driven high and the counter U48-3 holds at that point. Grounding terminal 8 of U45-9 by closing the "print on command" switch 202 allows the point segment counter U48-3 to advance until the C line goes low again at the beginning of the next S5 segment.

When jumper 200 is removed to print on command only, line 3e goes high and is effective as will be later described to block a print command to the solenoid operating the printer in response to the normal print command generated for automatic point sequencing.

The servo stop signal or stop command required on lines 80 of FIG. 2 is supplied by the circuit of FIG. 8 including flip-flop U36-15, gates U37-4 and U37-3, and transistor Q1 and associated circuitry. The servo stop signal is provided during the segment S10 of each point and S1 of the following point. The resulting interruption of the balancing operation of the servo during S10 allows the printing during that segment to be clear by assuring no motion of the printing head during the print cycle. The servo stop signal during segment S1 prevents drifting or jumping of the servo until an upscale signal is received by the servo. It also eliminates the effects of switching transients which might occur in switching the input relays.

The repetitive pulse for doing the stopping comes from the timing circuit and specifically from the output of gate U37-10 which output exists during the S10 and S1 segments. That signal is input to gate U37-4 which in turn provides one input to gate U37-3 whose output signal in turn initiates current flow through transistor Q1 by virtue of the base connection to the output of U37-3 by way of resistor R4. The current flow through transistor Q1 resulting from the output from U37-10 during segments S10 and S1 transmits a servo stop signal through the optical isolator 153 and operates on the servo circuit as previously described in connection with FIG. 2.

When the recorder is placed in a point hold mode of operation, which will be described more fully in subsequent descriptions of the recorder operation, the counters of the timing circuits continue to cycle. To avoid having the servo continually stopped during S10 and S1 segments, the flip-flop U36-15 is triggered by the actual point trigger so that if more than one S10 signal comes through from U37-10 before a new point trigger occurs, terminal 6 of U37-4 will be low to block the production of the servo stop signal.

The servo may be manually stopped by closing switch 210 which will cause the input at terminal 1 of U37-3 to go low and thus initiate a stop signal.

Figure 4:
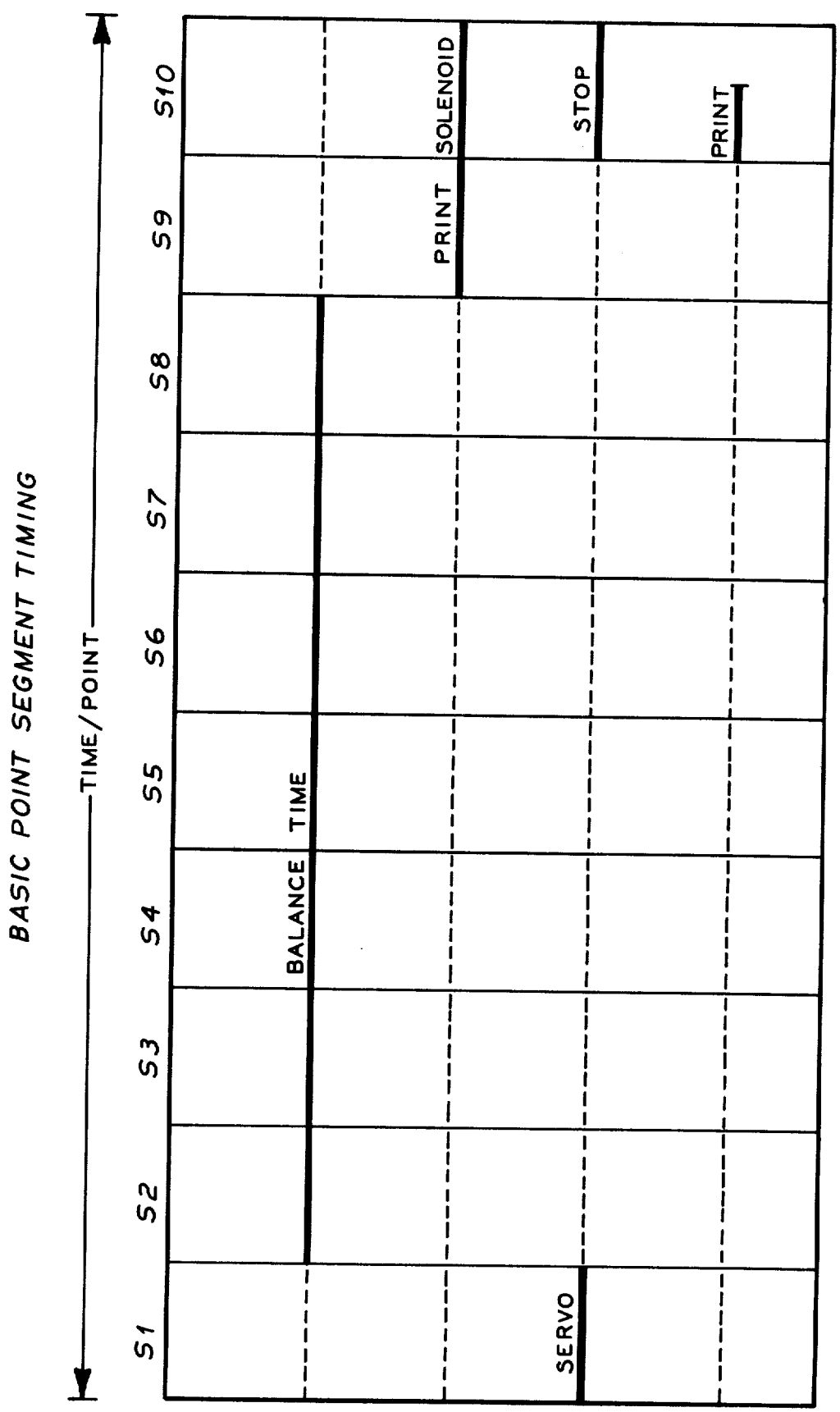
FIG. 4 is a timing diagram showing the sequence of events involved in recording.

The timing of the various recorder actions in a measurement cycle as set forth above are shown graphically by FIG. 4. From this diagram it will be evident that the time period represented by the segments S2-S8 are used by the servo system of FIG. 2 to come to balance so that the printhead is positioned at a point along the chart width related to the magnitude of the point being measured. Then during S9 and S10 the solenoid which engages the printhead is energized. Also, as indicated, the servo is stopped during S10 and the subsequent S1. The printing occurs during the first portion of S10 as shown.

Figure 5:
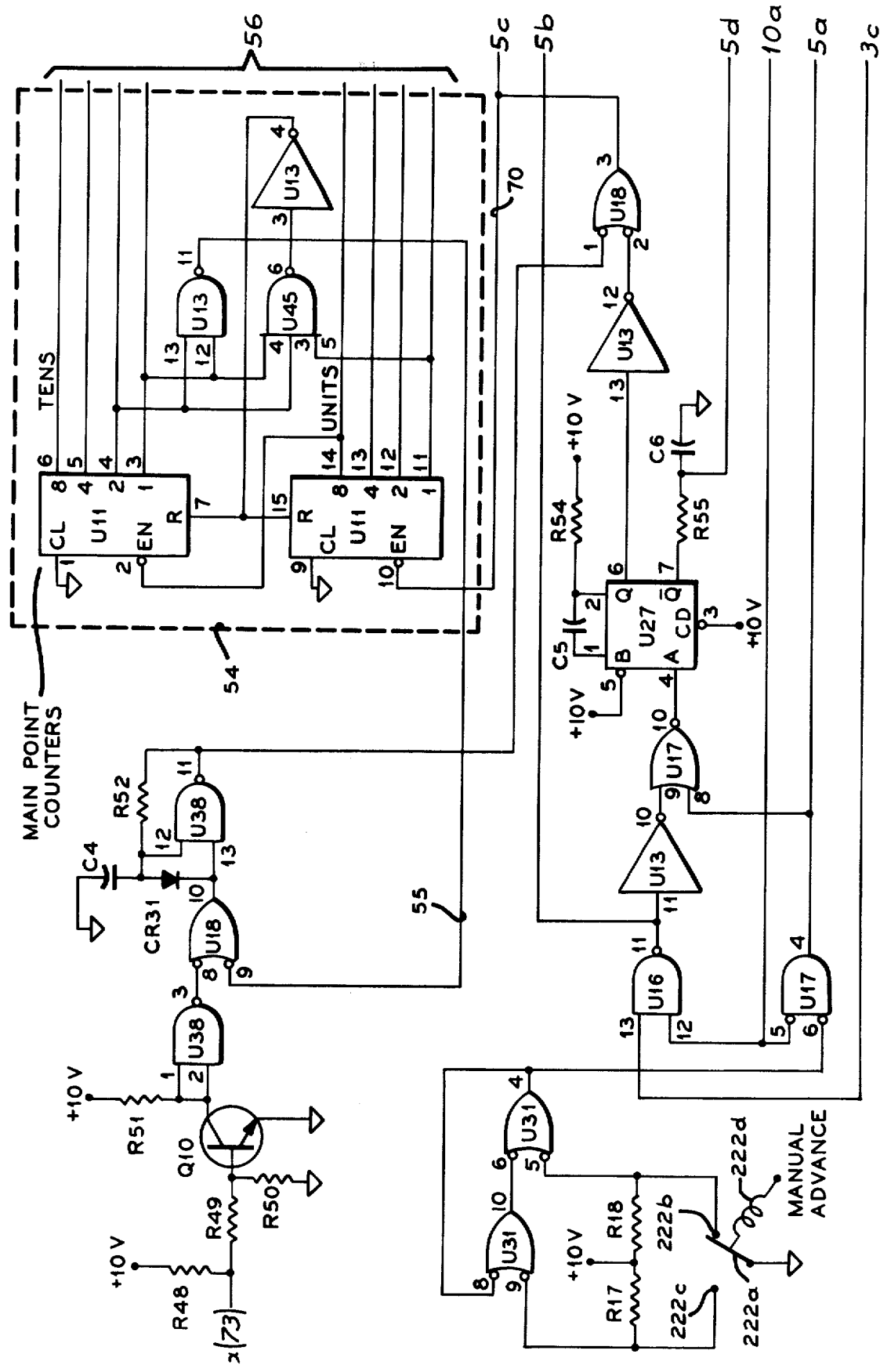
FIG. 5 is a logic diagram of the point counter of FIG. 1 and part of the timing circuit.

The circuit of FIG. 5 includes the point counter 54 as well as portions of the timing circuits 72 including that part which forms the actual point-trigger signal for various circuits of the recorder. The point counter 54 provides on the eight lines of point count bus 56 the point count in binary coded decimal form. The basic source of the point-trigger signal is the signal supplied by way of line 3c which signal appears during the segment S9 and S10. That signal is supplied as an input to terminal 13 of gate U16-11 which is enabled unless a signal is supplied on line 10a from the point-hold switch indicating that the point should be held at its present number. Thus, the gate U16-11 provides an output to inverter U13-10 which in turn supplies an input to gate U17-10 to provide a signal to the one-shot U27-6 which in turn provides a regular trigger pulse to the input of inverter U13-12. The output of inverter U13-12 is in turn connected to one of the inputs of gate U18-3 which then produces the actual point-trigger which is used in initiating the point count as an input to the cascaded counters U11-11 and U11-3. The actual point-trigger signal output of gate U18-3 is also supplied to an output line 5c for use in other circuits.

A complementary point trigger is supplied at line 5d (line 74 of FIG. 1) from the complementary output from terminal 7 of U27-6. The complementary output of the one-shot includes the resistor R55 and capacitor C6 connected in series to ground with the output line 5d being tapped from the junction between those components. U27-6 is timed by resistor R54 and capacitor C5. As shown, the unused terminal 5 of the one-shot is connected to a +10 volt supply as is terminal 3.

The production of the actual point trigger is inhibited only when the signal on line 10a is low thus disabling the gate U16-11 which is the case when the point hold switch is actuated, as will be described in connection with FIG. 10.

There are signals, other than the input of line 3c during the segments S9 and S10, which can initiate to production of a manual point-trigger signal in the form of a low signal on the input terminal 6 of gate u17-4 which is not enabled unless there is a point hold signal on line 10a. The output of gate U17-4 is then used to provide an input at terminal 8 of U17-10 whose output initiates the one-shot U27-6 to provide the regular trigger as an input to inverter U13-12 which in turn produces the actual point trigger as an output of gate U18-3.

The manual point-trigger signal supplied to the input terminal 6 of gate U17-4 is provided from the circuit which includes the gates U31-10 and U31-4. This manual advance circuit is operated by a switch which includes movable contact 222a and a fixed contact 222b normally kept in contact with 222a by spring 222d. Another fixed contact 222c is also provided. When the contact 222a is switched from its position in contact with 222b to the position in contact with 222c, the flip-flop formed by gates U31-10 and U31-4 has its outputs changed to the opposite state as so to provide the manual advance signal. Thus, when the contact 222a is in contact with the contact 222b, the terminal 5 of gate U31-4 is grounded and, therefore, the output of that gate is high providing a high signal on the manual point-trigger circuit to gate U17-4 and a high input at terminal 8 of gate U31-10, which will then in turn produce a low output to terminal 6 of gate U31-4 which will then hold the output of gate U31-4 low.

Whenever the switch contact 222a is operated to contact the fixed contact 222c, the input terminal 5 of gate U31-4 goes high due to the +10 volt supply to the interconnecting point between resistors R17 and R18 which bridges the terminals 9 and 5 of gates U31-10 and U31-4, respectively. When terminal 5 of gate U31 goes high and terminal 9 of gate U31-10 goes low, as will occur when the contact 222a is in contact with the fixed contact 222c, then the output of gate U31-10 to terminal 6 of U31-4 will be high and both inputs to the gate U31-4 will then be high making its output low, as it appears on terminal 8 of U31-10. This signal is supplied to terminal 6 of U17-4 providing the trigger signal since the output of the gate U17-4 provides one of the inputs to U17-10 and in turn an input to the one-shot which forms the trigger by way of the inverter U13-12 and gate U18-3. Thus, the point counters are advanced by the production of a point-trigger input to the units counter U11-11 whenever the manual advance switch contact 222a is moved from the fixed contact 222b to the fixed contact 222c.

The output of gate U17-4 is supplied to other circuits as a manual advance reset line over line 5a.

It should be noted that the automatic trigger output from U16-11 is sent by way of line 5b to the solenoid pulse circuit, for it is a signal which exists during the segments S9 and S10 when printing is to be effected.

It should be noted that the one-shot U27-6 fires on the rising or trailing edge of the input pulse so that triggering occurs at the end of segments S9-S10 or when the manual advance switch is released.

The main point counters consist of the cascaded counting circuits U11-11 and U11-3 which respectively provide the units and tens count in a binary coded decimal form to the output lines from terminals 3-6 and 11-14. Those output lines make up the point count bus which is common to the various parts of the recorder circuit since it is utilized to select the inputs relay, the number for the visual display and the number for printing. Thus, the eight lines which are provided as output lines from the counters U11-11 and U11-3 altogether make up the point count bus 56, which is shown in FIG. 1 as being supplied to the input relay decoder and driver 50, the printhead decoder and driver 60 and the visual display decoder and driver 66.

With the cascaded counters arranged as shown, there is a reset signal provided to the counter units from the output of the inverter U13-4 whose input is from a gate U45-6 which is enabled whenever the count reaches 31. Thus, the counters are reset to zero upon reaching a count of 31. The point counter therefore runs from zero to 30 to provide 30 points for the recorder (0 to 29( and one point (30) as a fake point for purposes to be explained later. The gate U13-11 is enabled when the count reaches 30 to provide a skip-trigger signal from its output to the input of the point skip circuit.

The skip circuit consists of an oscillator made up of U18-10 and U38-11. That oscillator produces pulses whenever the control line is high (U18 pin 10). If the control line is high for a short time, a few or even one pulse is generated. When the control line is held high, the oscillator runs at a speed of about 80 kilohertz to prevent operation of the recorder elements.

There are 30 point-selection switches 262 (FIG. 7b) which can be selectively actuated whenever it is desired to omit the recording of a certain point or a number of points, as will be described later. The common line from those switches is the line 7a (line 73, FIG. 1) which is connected to transistor Q10 through the resistor R49. The line 7a is also connected by way of resistor R48 to a +16 volt supply as shown, and also as shown is connected to the base of the transistor Q10 and through resistor R50 to ground.

The transistor Q10 becomes nonconductive so that the terminals 1 and 2 of gate U38-3 go high whenever the input on line 7a is low or, in other words, when a point is to be skipped. Thus, when a point is to be skipped, the oscillator generates a pulse as an input to terminal 1 of gte U18-3 so that a point-trigger is produced advancing the main point counter by one count. The frequency, namely 80 kilohertz, of the oscillator is sufficiently fast so that the mechanical elements of the recorder as well as the visual display and other elements are uneffected by the change in point number during the skip as the point number will quickly go to the next number which is not to be skipped. Thus, from the point of view of the operator of the recorder the visual display as well as the printing and the balancing action of the recorder are uneffected by the skipped points and the observer cannot observe that points are being skipped except by noticing the numbers displayed.

It will be noted that the skip control by means of the oscillator utilizing gates U18-10 and U38-11 is controlled not only by the skip control signal from the switches which select the points to be skipped but also is controlled by a skip trigger pulse provided as an input to terminal 9 of gate U18-10 and operates to skip over the pulse 30 to pulse 31 quickly, count 31 being the count at which the point counters are reset. It may thus be said that point 30 is a fake point in the counter and, as will be evident from the explanations of the circuitry and operation of this recorder, it is necessary to have an odd number of points (0 through 30) counted in order to have proper operation of the printing as described in the subsequent description of the recorder.

Figure 6:
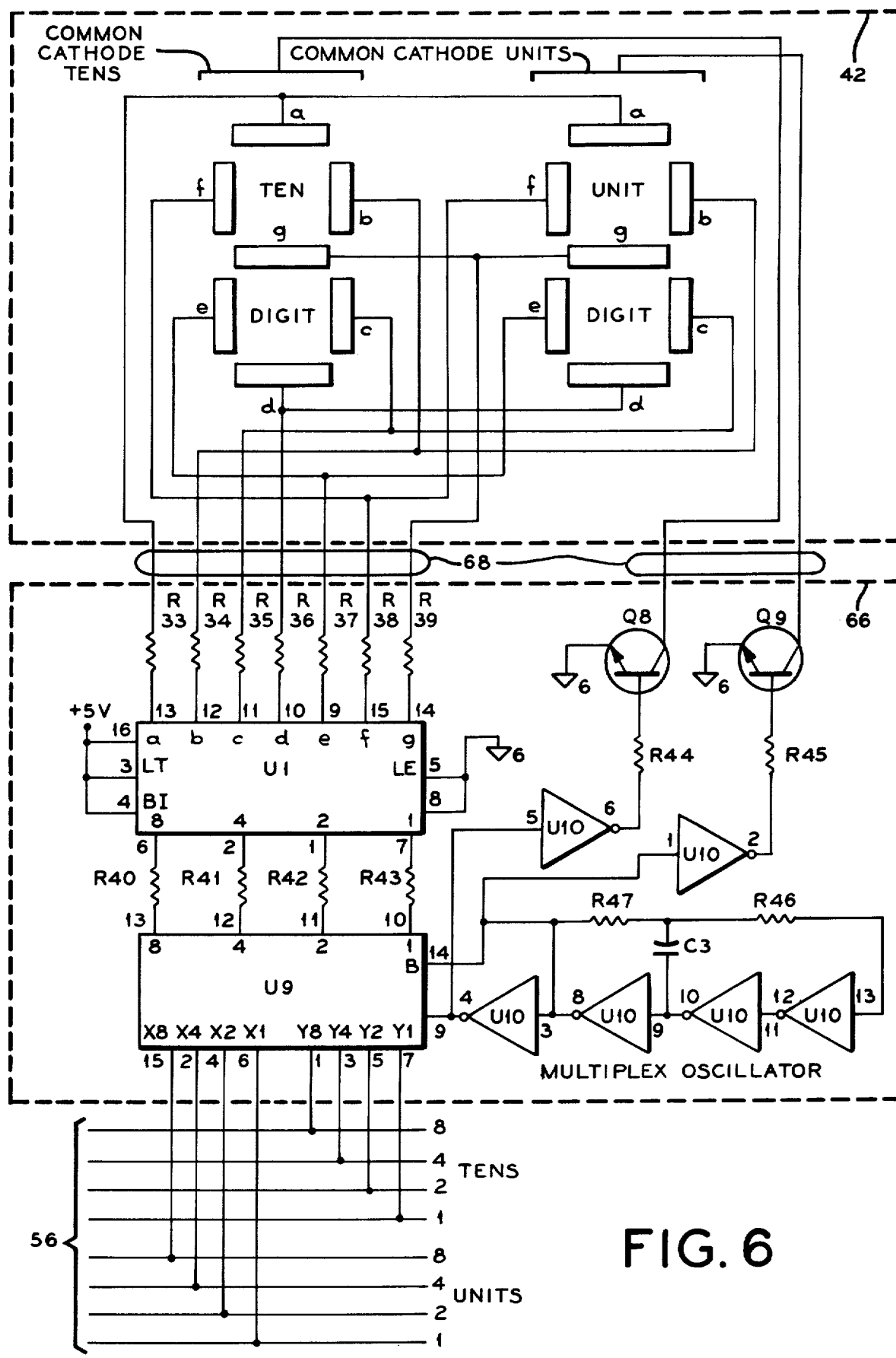
FIG. 6 is a logic diagram of the visual display circuit of the recorder system of FIG. 1.

FIG. 6 shows the circuit of the visual display decoder and driver 66 of FIG. 1. The visual display shown is an LED two-digit, seven-segment display. The information for display is inputted by way of the point count bus 56. The multiplexer U9-10 is connected to the point count bus and operates to switch alternately the tens and units codes of the bus onto the four common code lines connected to terminals 10-13 on the output of U9-10. The multiplexer U9-10 is operated by the multiplex oscillator formed by U10-12, U10-10 and U10-8 in conjunction with the resistors R46 and R47 which are serially connected between the output of U10-8 and the input of U10-12 with the capacitor C3 connecting the junction between R46 and R47 to the input terminal 9 of U10-8. The output of the multiplex oscillator which runs at about a frequency of 1 kilohertz operates through the inverter U10-4 to provide an input to terminal 9 of the multiplexer U9-10 while the other input required on terminal 14 of the multiplexer U9-10 is supplied from the output of U10-8. The multiplex oscillator also is effective through the inverters U10-2 and U10-6 and the output resistors R45 and R44 respectively to switch the transistors Q9 and Q8 alternately so that the units cathode, as operated by Q9, is on at the same time that the unit digit code is present on the output of U9-10 and so that the tens cathode is turned on by the transistor Q8 at the same time that the tens digit code is present on the output of U9-10.

The output lines of U9-10 are connected through resistors R40-R43 to the input of the BCD-to-7 segment decoder driver U1 which drives the anodes of the two-digit display. The output lines 9-15 of U1 are connected through cable 68 to the anodes of the display by way of the resistors R33-R39.

Figure 7A:
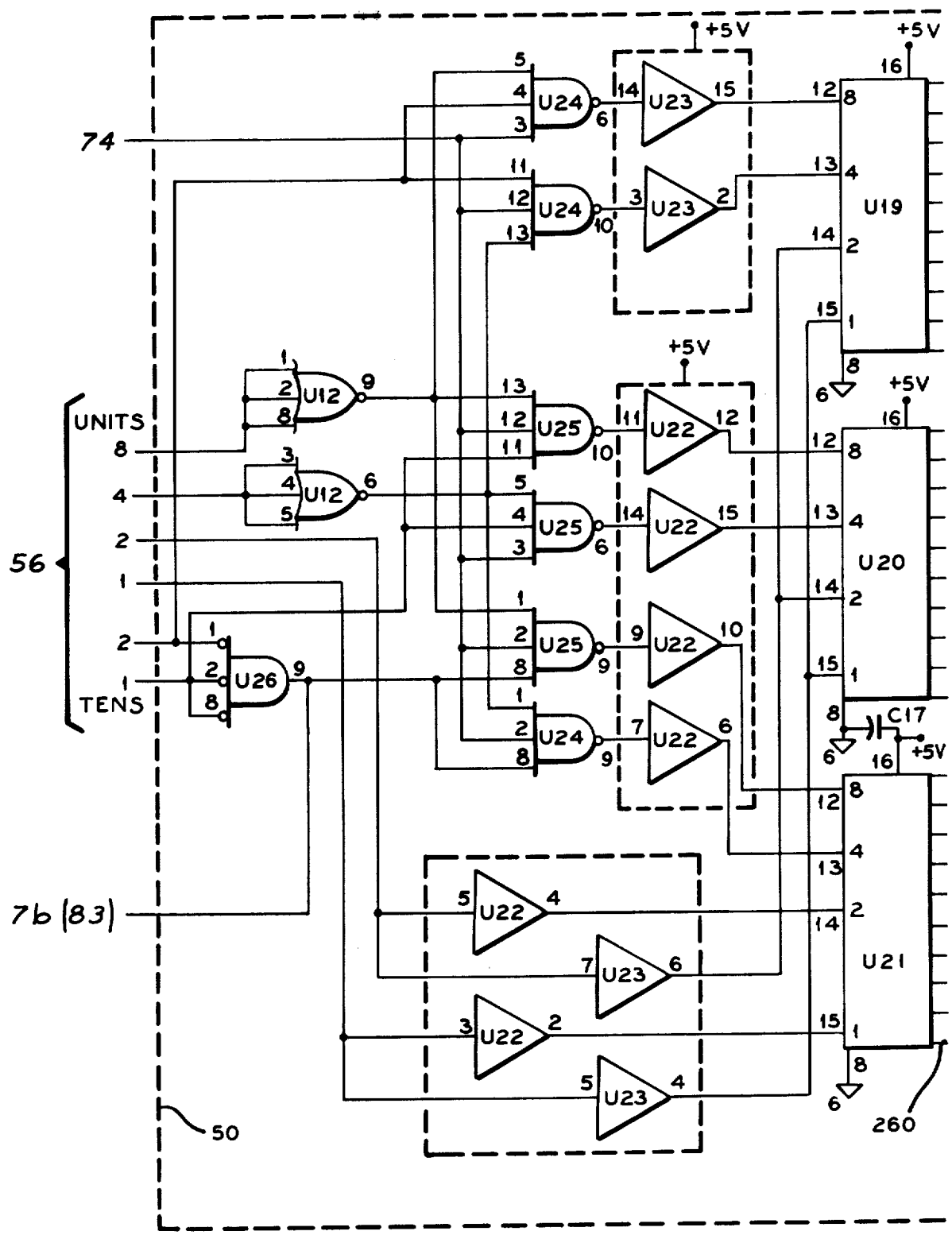
FIGS. 7a and 7b, when juxtaposed side by side with 7b to the right of 7a, form a logic diagram of the input relay decoder and driver of FIG. 1.
Figure 7B:
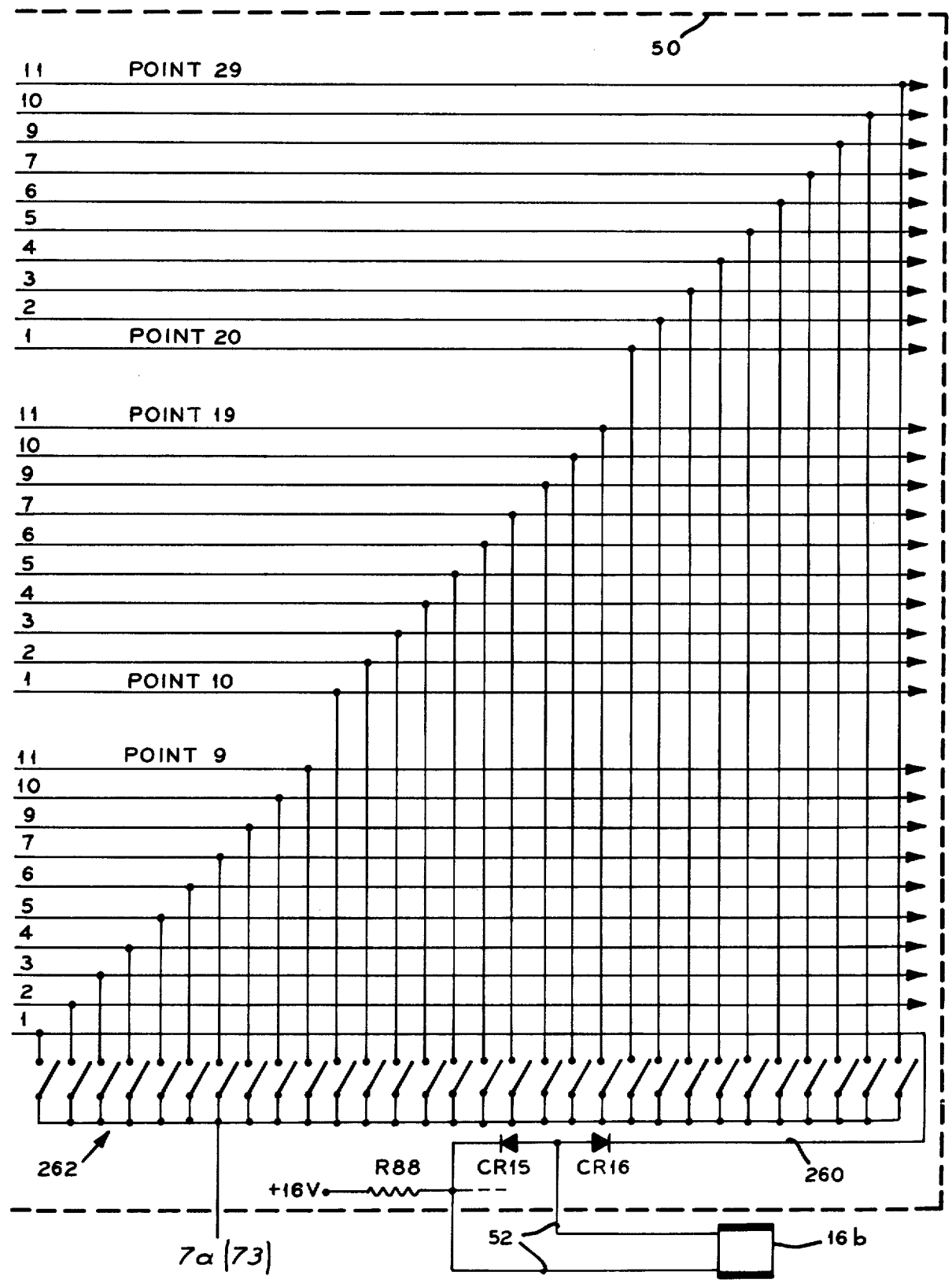

In FIGS. 7a and 7b taken together there is shown the input relay decoder and driver circuits 50 which has as inputs the main point count bus 56 as well as the delay signal input on line 74. U19, U20 and U21 are the relay decoder drivers. Since in this embodiment they are transistor logic circuits and run from a +5 volt power supply instead of the normal +10 volt power supply required for the CMOS circuits of the other elements, the buffers U22 and U23 are provided since they have 10 volt level inputs and provide 5 volt level outputs. One such buffer is provided for every input to U19, U20 and U21. The drivers U19, U20 and U21 selectively ground the relay drive lines to which their outputs are connected, therefore pulling in a particular input relay associated with that drive line. For example, when the driver U21 is operative to ground, the drive line 260 that serves to cause a current flow from the +16 volt source at one terminal of resistor R88. That current flows through the input relay actuator 16b for point "0". The relay operator 16b is suppressed by the rectifier CR15 and is in series with the rectifier CR16 so that current flow is allowed through the relay operator coil 16b only in one direction, namely from the power source to the relay driver U21 and no current flow from the relay driver U21 is allowed.

As shown, there are ten output lines from the driver U21 representing, respectively, the input points 0-9 whereas the ten output lines from the driver U20 are connected to drive the input relays for the points 10-19 and the output lines from the relay driver U19 are connected to the input relays for the points 20-29.

As the input relay decoder and driver circuits are operated, of course, only one input relay is energized at a time. The gates U24-6, U24-9 and U24-10 along with the gates U25-6, U25-9 and U25-10 perform the basic decoding for the point drive lines. Since the decoder drivers have ten output lines corresponding to input codes of 0-9, then any code greater than 9 will result in no point being selected by the drivers. Thus, the decoding is arranged to proceed as follows. The basic inputs to all three decoder drivers U19, U20 and U21 are the 8, 4, 2, 1 units code. To select which of the three decoder drivers is to be active, the 8 and 4 lines of the other two are forced to a high signal condition. Since this is a non-existent number, those drivers are inactive and only the remaining driver is therefore the selected one.

The tens lines of the point code do the selection. Thus, when the tens-1 and the tens-2 lines are both low, U24-6, U24-10, U25-10 and U25-6 are all forced high. This disables U19 and U20 and only U21 operates. If the tens-1 line goes high (points 10-19), U24-6, U24-10, U25-9 and U24-9 are all forced high disabling U19 and U21. That leaves the drive U20 working. If in another situation the tens-2 goes high, U25-6, U25-10, U25-9 and U24-9 are all forced high leaving only U19 functioning. The pull-in delay pulse forces all of the U24 and U25 gates high which disables all three decoders. That pulse occurs at the time of the switching between points so it has the effect of delaying the application of the proper code and pulling-in of the newly selected relay to guarantee a break-before-make action of the input relays as previously mentioned.

The function of the gates U12-6 and U12-9 is obviously to invert the logical significance of the signal on the units - 4 and units - 8 input lines from the main point count bus. That inversion is required for the logic of the gates U24 and U25. The gate U26-9 is utilized to introduce the function of the tens-1 and tens-2 line of the main point count bus to the logic of the decoding network and to supply on line 76 a zero blanking signal for the tens digit in the printing driver as will be subsequently explained. It will be noted that only two of the tens lines of the main point count bus are shown in this figure. The others are not needed since the maximum number of points contemplated in this example is 30 points.

Buffers U22 and U23 are provided in the units - 1 and units-2 lines which are connected directly to the 1 and 2 code inputs of the drivers U19, U20 and U21.

The output lines of relay decoders U19, U20 and U21, in addition to operating the input relays, also are connected to the 30 point skip switches 262. The other side of these switches (line 7a) goes to the point skip circuit as previously described on FIG. 5. To skip a point, the switch for that point is closed. When that particular line is energized (held down), line 7a is also low and the skip circuit operates as previously described.

Figure 8A:
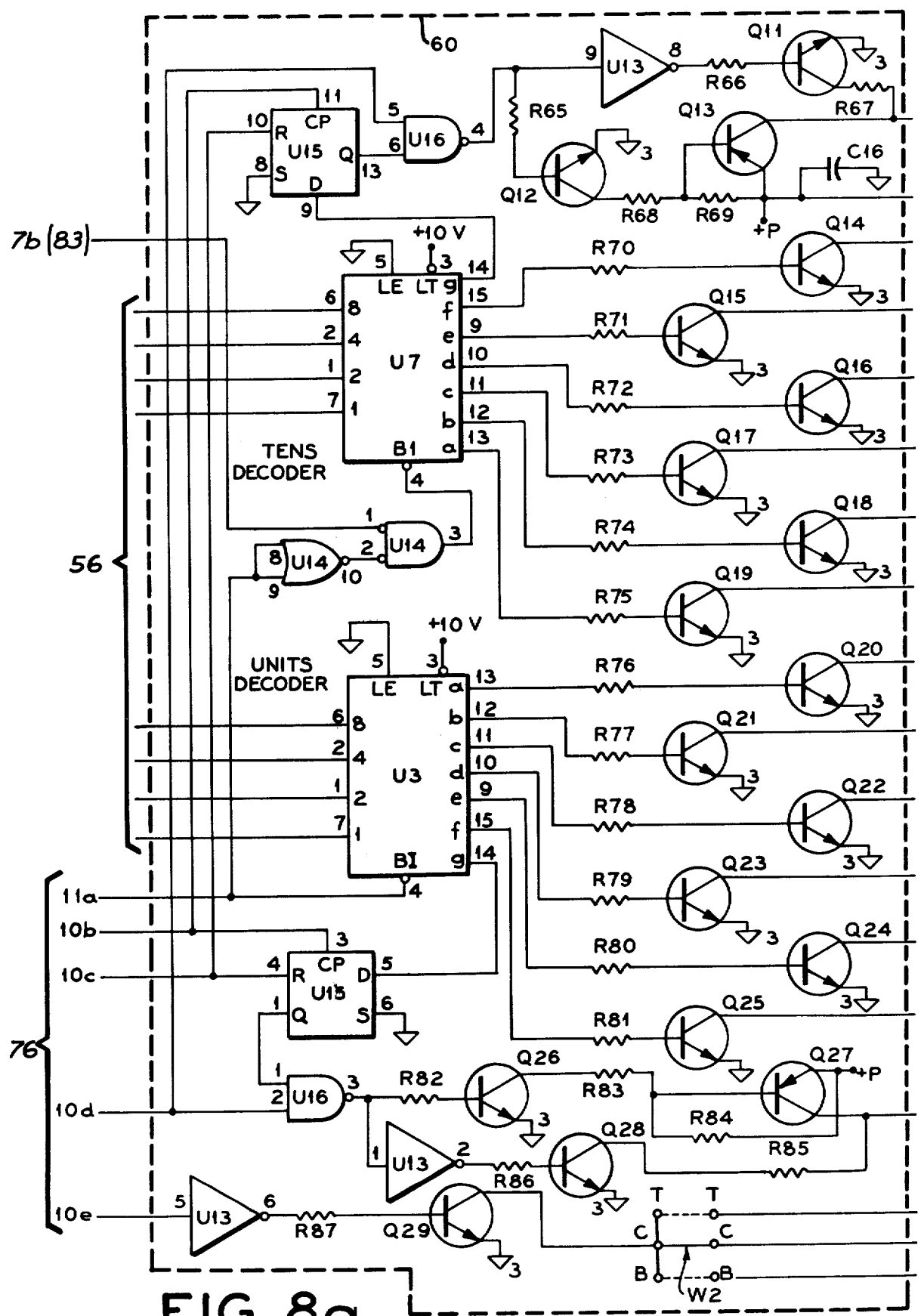
FIGS. 8a and 8b, when juxtaposed side by side with 8b to the right of 8a, form a logic diagram of the printhead decoder and driver as well as the printhead of FIG. 1.
Figure 8B:
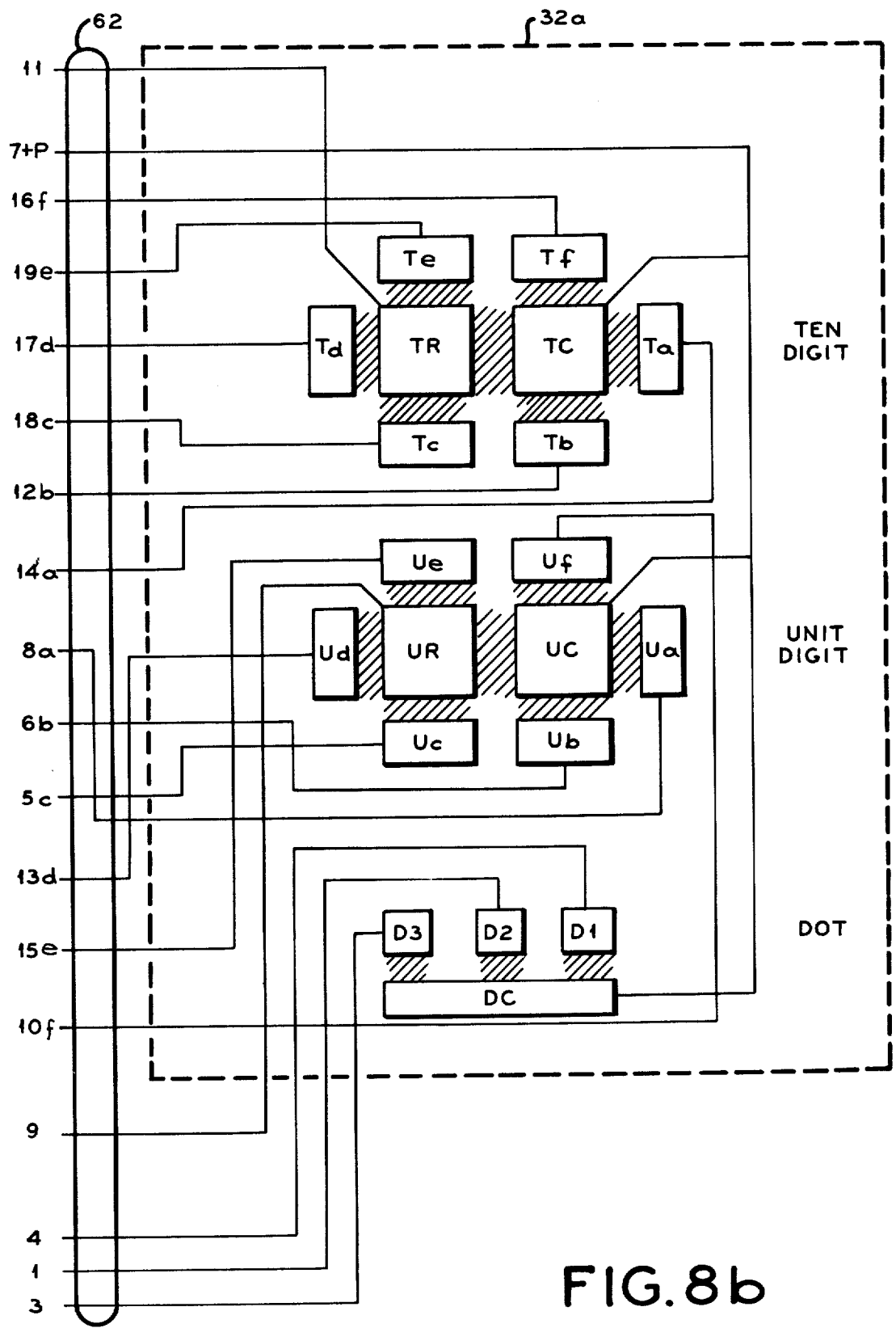

FIGS. 8a and 8b taken together show the printhead decoder and driver 60 as well as a schematic diagram of the printhead area 32a containing the characters to be printed. The characters of printhead area 32a are of the thermal type and each character is made up of seven segments arranged in a figure "8" pattern, that is with six peripheral segments and one center bar for each of the digits. The printhead area 32a is shown as having both a tens digit, a unit digit and is also arranged to print a dot. As shown in FIG. 8, there are three dots available to be printed and one only is selectively printed as determined by the circuit connections. The other two dots are spares so that they may be used to prolong the useful life of the printhead. The printhead shown is of the type described more specifically in U.S. Pat. No. 3,898,917 wherein it is explained that, for example, with the tens digit, the center portions TR and TC are conductive areas which are surrounded by other conductive areas, namely Ta, Tb, Tc, Td, Te and Tf. If, as in FIG. 8, the center portions TR and TC are at a positive potential +P and any of the peripheral segments $T_a$-$T_f$ are at ground potential by way of the circuit connections to them, then when the printhead is in contact with the chart paper, the heat generated in the area between the segments such as, for example, between TC and Ta, causes a bar to be printed on the chart paper in that position.

It will be evident that in order to print a numeral for either of the digits, which is not one which requires a center bar, then it is only necessary to ground selected ones of the peripheral conducting segments ($T_a$-$T_f$ in the tens digit and $U_a$-$U_f$ in the units digit) and the appropriate numeral will be printed on the chart paper when the printhead 32a is in contact with it so that the heat generated by conduction between the peripheral segments and the center portions TR and TC can impress a numeral on the paper. If, however, it is necessary to print a numeral with a center bar, for example, the numeral 8, it would then be necessary that the polarity of one of the central areas be reversed during a portion of the printing cycle. In the arrangement shown in FIGS. 8a and 8b, the TR area in the tens digit and the UR area in the units digit has its potential reversed during a second part of the printing cycle when a center bar is needed in those digits. With the reversal of the polarity on TR and/or UR, there will then be a current flow between TC and TR and/or between UC and UR causing a printing of a bar on the chart paper in the area between those center areas.

It will be obvious from the above that each printing cycle must necessarily include two periods: a first period for printing the necessary peripheral bars and a second period for printing the center bar if it is required. Thus, there is in the full printing cycle a first print cycle wherein the peripheral bars are printed and a second print cycle during which the center bar is printed, if necessary. The second print cycle is also utilized as the time during which the dot is printed, as will be explained.

As shown, the circuits of the printing head area 32a are connected by way of cable 62 to the printhead decoder and driver circuit 60. The input to the printhead decoder and driver circuit 60 includes the eight lines of point count bus 56 as well as the print cycle timing signals which are supplied over cable 76. The input lines from the point count bus 56 are connected to U3 and U7 which are BCD-to-7-segment decoders. Those decoders decode the input data representing the point count and turn on the proper transistor drivers connected to the segments of the individual digits of the printhead area 32a.

The BI input of both of the decoders is normally held low to keep all outputs off. As shown, the A-F outputs of each of the decoders go through driver transistors Q14-Q25 directly to the outer six segments of the characters of printhead area 32a.

The first print cycle consists of raising the BI input of the decoders to a high value for the proper time, in this case a nominal 20 msec. This is done by the 20 msec. pulse on line 1 of the circuit shown and described with regard to FIG. 11 and the resulting 20 msec. pulse for timing the first print cycle which then appears on line 11a. The pulse from line 11a goes directly to the B1 input of U3 and goes through the gates U14-10 and U14-3 to the B1 input of decoder U7. The gate U14-10 functions only to reverse the polarity of the signal while the gate U14-3 serves to provide for blocking the input to B1 of U7 if the tens digit is a zero. This blocking function results from the input to gate U14-3 supplied over line 7b on which there appears a high signal whenever the tens digit is zero.

The flip-flops U15-1 and U15-13 serve as storage for center bar information. The information that a center bar is needed comes from the g-outputs of decoders U3 and U7; however, this information is present only during the first cycle time (when B1 is high) and is needed during the second cycle time. Therefore, it must be stored during the first cycle time. The g-outputs of U3 and U7 go to the input terminal 5 of U15-1 and to the input terminal 9 of U15-13, as shown in FIG. 8 so that the flip-flops U15-1 and U15-13 change their outputs to match the inputs when the clock pulse is applied to the flip-flops as, for example, at terminal 3 of U15-1 and terminal 11 of U15-13. The clock pulse is the center bar strobe line pulse and is received as the signal from line 10b. The strobe pulse causes the "g" information to be stored in the flip-flops U15-1 and U15-13 for use during the second print cycle time.

If the instrument is put into the trend mode of operation, that is, where it is desired to print only the dots representing the value of a single input without a number so as to follow the change in value of that particular variable as a single point recorder would do, the information in the flip-flops U15-1 and U15-13 must be cleared from those flip-flops. To accomplish this, the flip-flops U15-1 and U15-13 are reset by the signal from line 10c which signal is high whenever the recorder is in the trend mode. The center bar information is outputted from flip-flop U15-1 as an input to the gate U16-3 and the center bar information from flip-flop U15-13 is outputted as an input to gate U16-4. The other input to gates U16-3 and U16-4 are a signal from line 10d which is the second print cycle time pulse, which in this case is a positive pulse with a nominal 40 msec. duration. When the second print cycle time pulse is received on line 10d, the gates 16-3 and 16-4 are both enabled indicating that a center bar is called for so that the outputs of the gates U16-3 and U16-4 go low for 40 msec., approximately. This fires the voltage reversing circuit which prints the center bar.

The voltage reversing circuit, in the case of the center bar for the units digit, includes the transistors Q26, Q27 and Q28 as well as the inverter U13-2 in conjunction with the resistors R82, R83, R84, R85 and R86. This reversing circuit is such that Q26 is normally on as is Q27 while Q28 is normally off (for the unit digit circuit). In that situation, the voltage supply +P which may, for example, be 22 volts, is supplied to the conductive area UR at the units digit of printhead area 32a. The voltage on the area UC, as supplied from the capacitor C16 and the power source +P in shunt with that capacitor, is equal to the voltage on UR and therefore no center bar is printed. However, in the situation where the center bar is to be printed, namely when the output of U16-3 goes low, it operates to turn Q26 and Q27 off and turn on Q28. That causes the conductive area UR of the units digit element to be connected substantially to ground through the transistor Q28 and resistor R85.

The circuit for the tens digit is identical and that circuit involves the transistors Q11, Q12 and Q13 along with the inverter U13-8 which in conjunction with the resistors R65, R66, R67, R68 and R69 perform in a manner similar to that described for the reversing circuit of the units digit, except that they serve to effect a printing of the center bar for the tens digit.

The dot on the printhead, either D1, D2 or D3 as determined by the location of the jumper at the output of transistor Q29, is controlled by the signal from line 10e which is supplied through inverter U13-6 and resistor R87 in the base of transistor Q29 so as to selectively cause a grounding of the conductive area D1, D2 or D3, whichever is selected through the transistor Q29 so that heat is generated between the conductive bar DC and one of the conducting areas D1, D2 or D3 to print the dot on the chart paper when the printhead 32a comes in contact with it.

Figure 9:
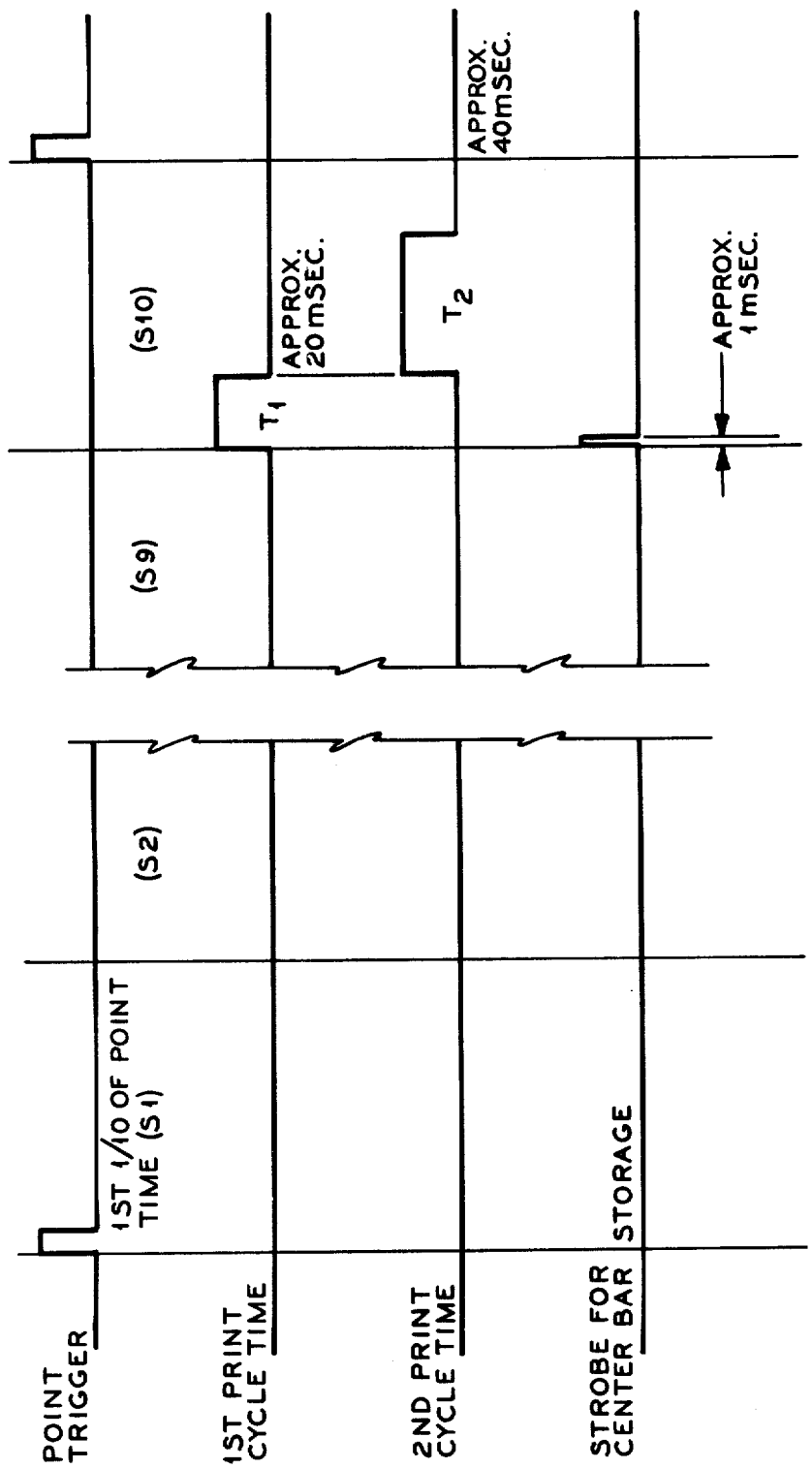
FIG. 9 is a timing diagram of the printing sequence.

It will be evident that the dot is printed during the second cycle time since the pulse on line 10e is a negative pulse of approximately 40 msec. duration which occurs at the same time as the pulse on line 10d. Normally the dot D2 is used and therefore the jumper on the output of transistor Q29 is located as shown in the drawing; however, when that dot will no longer print satisfactorily, the jumper may be moved to connect another one of the dots for operation. It should be kept in mind that the first print cycle and the second print cycle, as well as the center bar strobe signal, all occur during the segment S10. The first print cycle beginning at the beginning of segment S10 and lasting for approximately 20 msec. while the second print cycle starts at the end of the first print cycle and last for approximately 40 msec. The center bar strobe in this example is approximately a 1 msec. pulse which occurs at the beginning of the segment S10. This timing will be more evident by reference to FIG. 9 which in addition to showing the first and second print cycle timing pulses and the center bar strobe pulse also shows the point trigger pulse.

Figure 10:
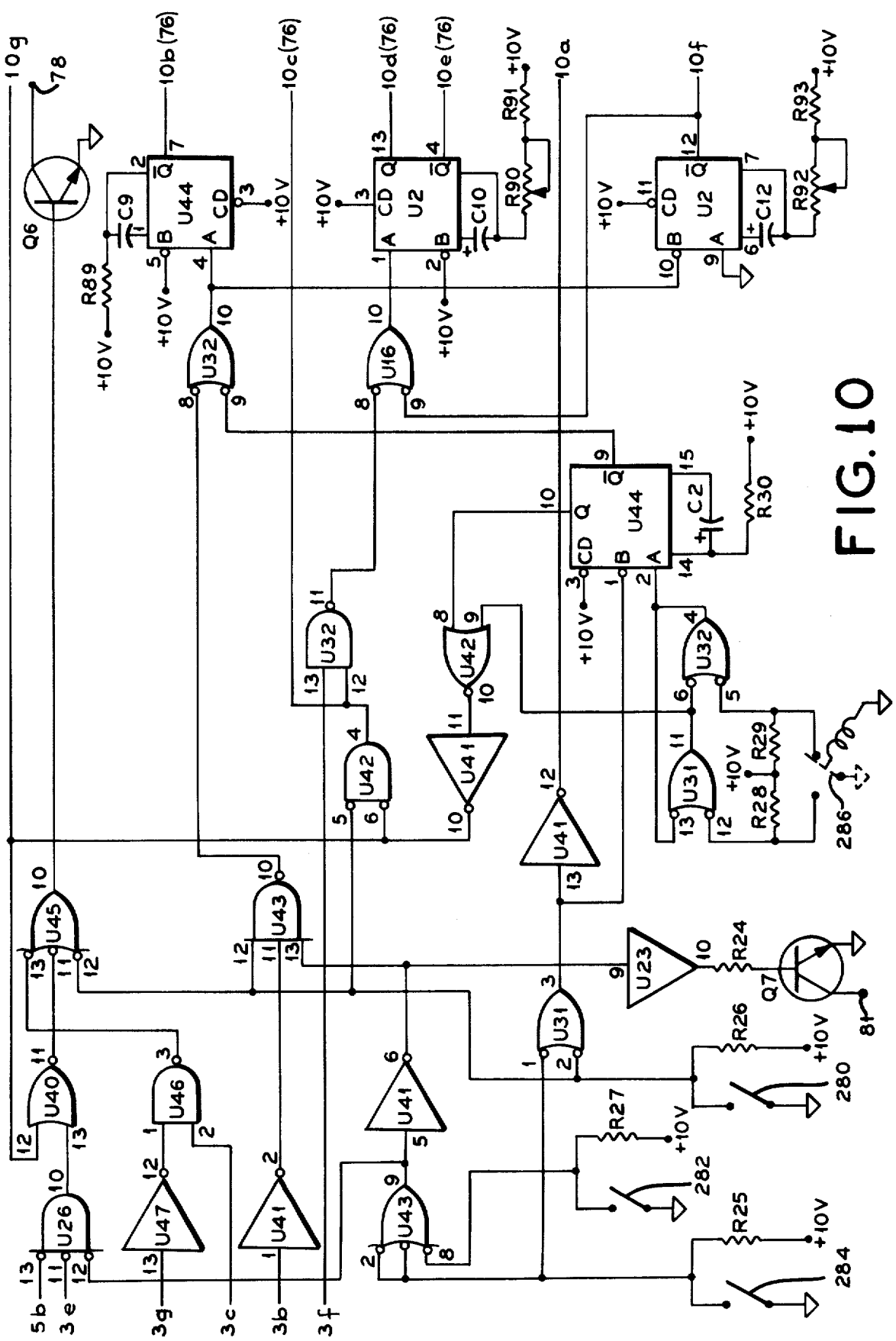
FIG. 10 is a logic diagram of another part of the timing circuit of FIG. 1.

The circuit of FIG. 10 is a diagram showing some of the timing circuits 72 of FIG. 1 which include control and timing circuits to operate the printhead drive circuits and other print related components such as the solenoid, the chart drive, etc. The signal which is supplied on line 3b, representing the period for the segment S10, forms the basic input to start the print sequence. It appears as an input to the inverter U41-2 which then produces an input at terminal 11 to the gate U43-10. The gate U43-10 serves to block that print command under any point hold conditions or for operation of the recorder in the trend mode. Thus, for example, a signal input on the line to terminal 12 of U43-10, which is generated by the closing of the trend switch 280 serves to block the print command signal from being generated at the output of gate U43-10. Also, the presence of the signal at the input terminal 13 of the gate U43-10 can block the generation of the normal print command signal at that gate's output.

The blocking signal generated at terminal 13 of gate U43-10 results from either the print hold switch 282 being closed, indicating operation of the recorder so that no printing occurs until desired, or from the point hold switch 284 being closed indicating that the operator desires that there be no advancement to the next point. Both the closing of the print hold switch and closing of the point hold switch operate to provide an output from gate U43-9 to the input of inverter U41-6 and thence to the input at terminal 13 of gate U43-10 so that the operation of the print hold switch 282 or the point hold switch 284 is effective to block the S10 print command signal from passing through gate U43-10 to form the normal print command signal at its output.

When the print command passes through U43-10, it goes through the gate U32-10 to the timer U2-12 which in conjunction with resistors R92 and R93 and capacitor C12 is a one-shot producing a 20 msec. pulse. That one-shot is the first cycle print timer while the one-shot U2-13 with its associated resistors R90 and R92 along with capacitor C10 is the second cycle print timer which fires on the trailing edge of the pulse produced by the first cycle print timer as a result of the connection of the second cycle print timer to the first cycle print timer output through gate U16-10.

If the recorder is used in the trend mode, there will be a pulse string input to terminal 8 of gate U16-10 which will be effective to fire the second timer only giving a rapid dot pattern on the chart since the pulses provided as an input to gate U16-10 appear at the rate of 10 per second. Those pulses are produced as an output of gate U32-11 which gets an input at its input terminal 13 from line 3f with its other input at terminal 12 being supplied by gate U42-4 which has as one of its inputs the signal resulting from the closing of the trend switch 280 and as its other input a signal from the inverter U41-10 derived from the manual print signal produced by gate U42-10.

The same signal that fires the first print cycle timer also fires the one-shot U44-7 which includes the associated resistor R89 and capacitor C9 to produce the strobe signal for printing the center bar on its output line 10b.

The circuit shown in FIG. 10 includes a circuit which provides a combination of gates U31-11 and U32-4 to form a flip-flop which is operated by the manual print switch 286. When the manual print switch is in its normal position, it is in contact with terminal 5 of gate U32-4 so as to ground that terminal. Whenever a manual printing is desired, the switch is actuated to the opposite position so that the terminal 12 of gate U31-11 is grounded and the terminal 5 of gate U32-4 is allowed to go high. This flip-flop provides a signal for firing the one-shot U44-9 which in conjunction with resistor R30 and capacitor C2 is timed to provide an output of about 100 msec. duration. The $\overline{Q}$ output of the one-shot U44-9 is the manual print command which is utilized as an input to gate U32-10 where it is used as one of the sources for initiating the first print timer U2-12. The first print timer can also be initiated by the normal print command which is the other input to U32-10.

The Q output of the one-shot U44-9 is utilized as one input to gate U42-10 whose other input is from the flip-flop connected to the manual print switch so that there is formed a composite pulse which is used to produce a manual print signal as an input to the inverter U41-10 and thence as an input to gate U42-4. The gate U42-4 is then enabled when the manual print signal exists in combination with the closing of trend switch 280 indicating that the recorder should be operated in the trend mode, thus the output of the gate U42-4 is a signal on line 10c to the reset terminal of the center bar storage flip-flops and the output also provides an input to gate U32-11 whose other input is from the line frequency counter where there are produced ten pulses per second so that the output of gate U32-11 when the recorder is in the trend mode of operation is a series of pulses at the rate of 10 per second forming an input at terminal 8 of gate U16-10. That series of pulses then provides for the operation of the second print timer U2-13 as mentioned.

The print solenoid 79 (FIG. 1) is energized by current flow over line 78 through the transistor Q6, which is controlled by gate U45-10. That gate requires any of three conditions to provide an output for operating the solenoid, namely there must either be a signal indicating a normal print operation or a signal indicating print-on-command operation or a signal indicating trend operation.

The normal print signal is introduced at terminal 11 of gate U45-10 as an output from gate U40-11 whose inputs include a manual print signal at terminal 12 of gate U40-11 which will enable that gate, or the gate may also be enabled by an input at terminal 10 from gate U26-10 which is enabled by a combination of signals from lines 5b, 3e and from the output of gate U43-9. The input from line 5b is during the segment S9 and S10 or the input from line 2e is a signal whose purpose is to block operation for print-on-command, that is to block the normal operation of solenoid during the operation of the recorder on the print-on-command mode. The other signal to terminal 12 of gate U26-10 is for blocking when the recorder is on a print hold mode of operation. Thus, there is produced as an output of gate U40-11 a normal solenoid pulse which is effective to cause the gate U45-10 to actuate the solenoid when there is a manual print signal on line 10g or when there is no blocking necessary because of the print hold mode and no blocking necessary because of the print-on-command mode during the S9-S10 segments, as determined by gate U26-10. Thus, the gate U40-11 provides for manual solenoid operation or automatic solenoid operation. The manual solenoid operation is produced by virtue of the signal on line 10g while the automatic solenoid operation is produced by virtue of the output of gate U26-10 from the S9-S10 timing pulse which can be blocked either by a print hold or a print-on-command signal. The S9-S10 timing pulse enables gate U46-3 when there is a print-on-command signal from the line 3g which provides an input to inverter U47-12.

Figure 11:
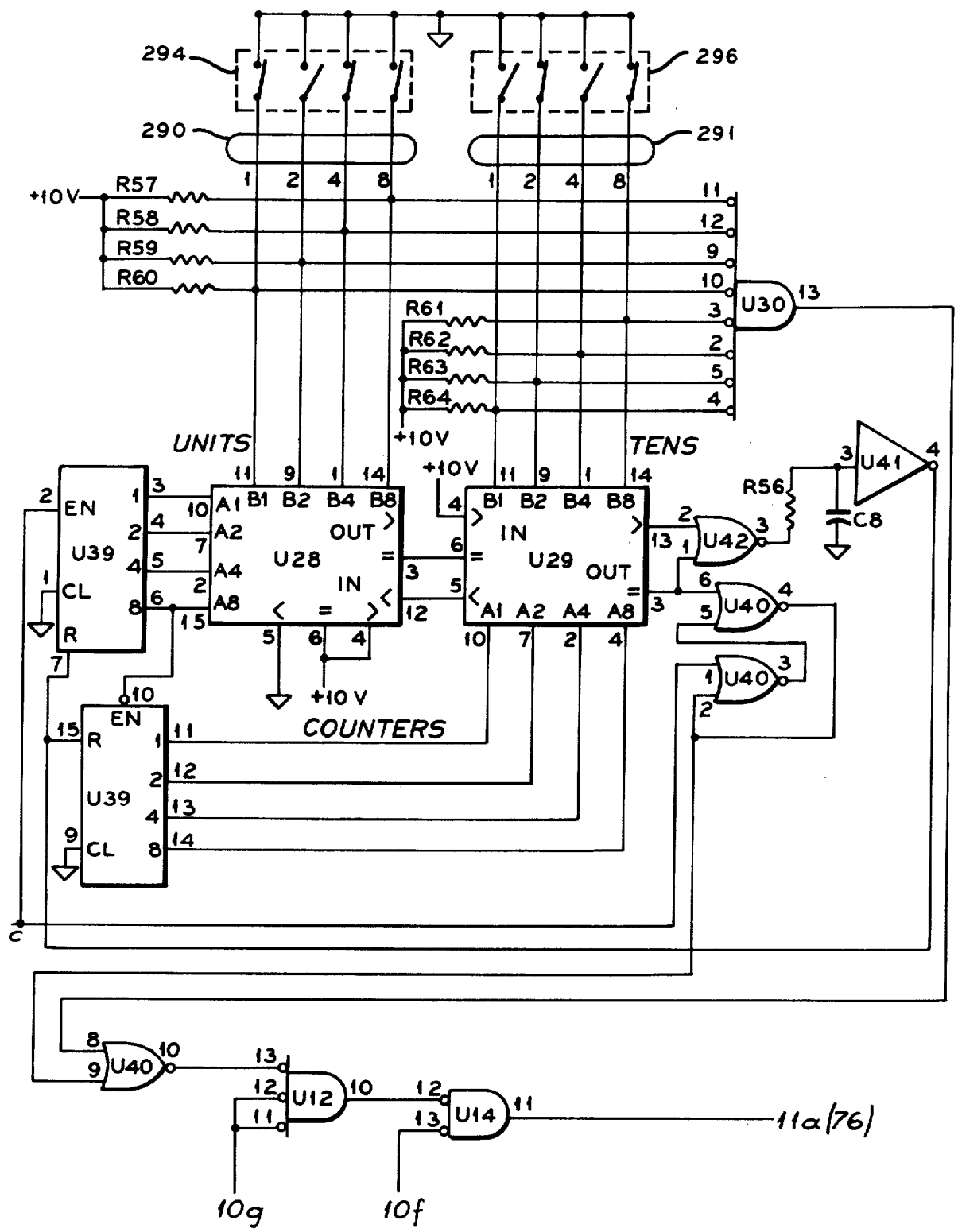
FIG. 11 is a logic diagram of still another part of the timing circuit of FIG. 1.

FIG. 11 is a part of the timing circuits 72 of FIG. 1 and its shows the operation of the variable rate point identification system of the recorder which by the setting of two switches enables the operator to select the number of times each point is to be printed without identification numbers before an identification number is printed with the point. For example, for clarity of recording, it may be desirable to print a number only every fourth time each of the points is recorded so that the printed numbers do not so clutter the chart paper that the actual recording of the dot indicating the value of the variable is difficult to read on the chart.

There is only one output of the circuit of FIG. 11 and that is the output on line 11a, which is the first print cycle timer pulse. That pulse is gated and fed to the decoders in the printing circuit, as described in FIG. 10. As will be evident from the description of FIG. 10, if the pulse appears on line 11a as an output of gate U14-11, a number will print on the chart; however, if that pulse is blocked as by a high input to terminal 12 of gate U14-11, a dot only will print on the chart. Thus, under the condition in which a number is printed with each dot recorded for each point, the signal appearing on line 10f, which is a first print cycle timer pulse, is gated through gate U14-11 to give a pulse on line 11a each time a point is recorded; however, where it is desired to not identify each point with a number, the line connected to terminal 12 of gate U14-11 will be effective during certain portions of the operation time of the recorder to block the printing of a number and thus allow only the printing of the dot. The blocking signal is produced by gate U12-10.

If a manual print is called for, as by a high signal appearing on line 10g, then the input to terminal 12 of gate U12-10 will be high and a number is printed since the output of gate U12-10 would be low. When manual printing is not involved, the question of whether or not a number is printed is controlled by the output of gate U40-10 which is an input to gate U12-10 at terminal 13.

Gate U12-10 will provide at its output a low signal under two conditions. The first condition is when there is a high signal on terminal 8 of gate U40-10 as a result of a high signal output from gate U30-13 indicating that dots only are to be printed. The other situation when the gate U40-10 produces a low output is when a signal appears at the output of gate U40-4 in the dot/number flip-flop made up of gate U40-4 and U40-3. Thus, when the output of gate U40-4 is high, a dot will be printed or when that output is low, a number will be printed if the output of gate U30-13 is also low.

The circuit for determining the number of dots which will be identified by numerals, or in other words the number of dots for each point to be printed before a dot is identified by a numeral, includes not only the gates mentioned above but also cascaded counters U39-3 and U39-11 which are arranged to receive point trigger pulses from line 5c and to count those point trigger pulses and hence count the number of points since those counters were last reset. The outputs of the counters are compared in comparators U28 and U29 to the count set by the switch settings as represented by the signals on lines 290 and 291, respectively. The units counter U39-3 has its outputs connected to the A terminals of comparator U28 whereas the tens counter U39-11 has its outputs connected to the A terminals of comparator U29. The B terminals of the units counter U28 are connected to a binary coded switch 294 as well as to +10 volt supply through the resistors R57-R60. Similarly, the comparator U29 has its B inputs connected to a binary coded decimal switch 296 as well as to a +10 volt potential supply through resistors R61-R64. The binary coded decimal switch, which in this case are two in number for setting the units and tens digits of the number of points to be printed without a numeral, are switches which are arranged to connect the selected input lines of the comparators U28 and U29 to ground so as to operate to provide an input to the comparators U28 and U29 on those lines to the B inputs of the comparator which are not connected to ground and hence are maintained at a high condition by the +10 volt potential supply.

The binary coded decimal counters U39-3 and U39-11 have their outputs compared with the settings of the binary coded decimal switches 294 and 296 of the comparators U28 and U29. As the counters count up toward the numbers set on the switches, the comparators sense that their A inputs are less than their B inputs and thus outputs from terminals 13 and 3 of comparator U29 are both low. The flip-flop formed by gates U40-4 and U40-3 is continually being reset by the point trigger connected to terminal 1 of gate U40-3 from line 5c. This keeps the flip-flop in condition such that the terminal 4 of gate U40-4 is high which tnen provides the necessary signal to gate U40-10 so that dots only are printed. When the counters reach the number set in the switches, then the comparators sense that A=B and terminal 3 of comparator U29 goes high. That change in the output of terminal 3 of comparator U29 sets the flip-flop allowing a number to be printed along with the next dot. The setting of the flip-flop is also effective to reset the counter to zero by virtue of the connection of the output of the delay elements comprising U41-4 and capacitor C8 along with resistor R56 to the output of gate U42-3, which is enabled by an input from either terminal 3 or terminal 13 of comparator U29. There will be an input, of course, from terminal 3 whenever A=B, as pointed out above. There will also be an input from terminal 13 whenever for some reason the counters get to a state which is greater than the switch settings. Then the counters will be reset without the flip-flop being affected.

As will be evident from the circuit of FIG. 11, the gate U30-13 is enabled whenever the setting of the two switches 294 and 296 is such that all of the B inputs to the comparators U28 and U29 would be low, as shown in FIG. 11. This results from the fact that all of those inputs on lines 290 and 291 are connected to ground by the switches so that the gate U30-13 produces a high output which indicates that dots only should be printed.

If, for example, switches 294a, 296a and 296b are open, then 25 dots will be printed for each point before an identifying numeral is printed.

The logic components identified by the "U" numbers can be CMOS or TTL logic devices of the type manufactured by a number of companies and can be the specific devices identified by the package notation in the following table:

| REF. DESIGNATION | PACKAGE |
| --- | --- |
| U1, U3, U7 | 4511 |
| U2 | 74C221 |
| U4, U8, U9 | 4519 |
| U5 | 4068 |
| U6 | 4520 |
| U10, U13, U41, U47 | 4069 |
| U11, U39, U48 | 4518 |
| U12, U26 | 4025 |
| U14, U17, U35, U40, U42 | 4001B |
| U15 | 4013B |
| U16, U18, U31, U32, U37, U46 | 4011B |
| U19, U20, U21 | 7445 |
| U22, U23 | 4050 |

-continued

| REF. DESIGNATION | PACKAGE |
| --- | --- |
| U24, U25, U43, U45 | 4023 |
| U27, U44 | 4528 |
| U28, U29 | 4585 |
| U30 | 4078 |
| U36 | 4027B |
| U38 | 4093 |
| U49 | 4002B |

What is claimed is:

1. Apparatus for controlling the measurement and recording of the magnitude of a plurality of unknown signals by a multipoint recorder of the type utilizing a balanceable measuring system operable to position a printing element along a chart so that the position is representative of the magnitude of the unknown signal being measured and to then actuate a printing element to print at said position indicia identifying said unknown signal and its magnitude, comprising:

means for sequentially producing coded address signals identifying the unknown signals to be measured.

randomly addressable means responsive to said address signals for connecting the identified ones of said unknown signals to said measuring system, and randomly addressable means responsive to said address signals for actuating the printing element to record on said chart indicia representing the identified unknown signal being measured and indicate its magnitude after said balanceable measuring system has positioned said printing element.

2. Apparatus as set forth in claim 1 which includes randomly addressable visual display means responsive to said address signals for producing a visual display identifying the unknown signal being measured.

3. Apparatus for controlling the measurement and recording of the magnitude of a plurality of unknown signals by a multipoint recorder of the type utilizing a balanceable measuring system operable to position a printing element along a chart so that the position of the element is representative of the magnitude of the unknown signal being measured and to print at said position on indicia identifying said unknown signal and its magnitude, comprising:

first randomly addressable means for selectively connecting the unknown signal addressed to the measuring system, second randomly addressable means for selectively operating said printing element to print indicia corresponding to the unknown signal addressed when said measuring system has positioned said printing element in conjunction with the balancing of said measuring system, and means for simultaneously addressing said first and second addressable means with sequentially produced coded address signals identifying the unknown signals in the order in which they are to be measured.

4. A multipoint chart recorder comprising:

a balanceable measuring circuit, a randomly addressable input switching means for selectively connecting each of a plurality of unknown signals to said measuring circuit, a randomly addressable printing means for selectively printing on said chart an indicia identifying said unknown signals, a positioning system operable in conjunction with the balancing of said measuring circuit to position said printing means on said chart to a position representative of the measured value of the unknown connected to the measuring circuit, means for sequentially producing coded address signals for identifying the unknown signals to be measured, and means for transmitting said address signals simultaneously to both said addressable input switching means and said addressable printing means so as to effect a printing of indicia on the chart identifying the unknown signal being measured and indicating its value.

5. A multipoint recorder as set forth in claim 4 in which said address signals are advanced at fixed periodic interals.

6. A multipoint recorder as set forth in claim 5 which includes means for preventing the balancing action of said measuring circuit for a terminal portion of said periodic intervals to allow said printing means to effect a printing of indicia without concurrent operation of said positioning system.

7. Apparatus for synchronizing the input selection and point recording of a multipoint recorder of the type having a balanceable measuring circuit and a printhead connected to move across a chart with the balancing of said measuring circuit by a distance representative of the magnitude of the input selected, comprising:

an electronic digital counter operable to sequence through the total number of input points to be measured so as to sequentially produce on a common point count bus coded signals identifying each point, an input switch associated with each point to be measured and operable to connect the corresponding input to said measuring circuit, a decoder and driver responsive to the coded signal on said bus to energize the input switch for the identified point, a printhead decoder and driver operable in response to said coded bus signal to cause a selection by said printhead of the indicia identifying the point being measured, and a strobe signal producing means operable after said measuring circuit has been balanced to cause said indicia to print on said chart.

8. A multipoint chart recorder comprising:

a plurality of input terminals for receiving different signals to be measured, a balanceable measuring circuit, timing means operable to periodically produce normal trigger pulses, a counter for producing coded point selection address signals which advance in sequence in response to trigger pulses, a randomly addressable input switching means responsive to said address signals for sequentially connecting selected ones of said signals to said measuring circuit, a randomly addressable printing means responsive to said address signals for printing on said chart an indicia identifying said selected signals, a positioning system operable with the balancing of said measuring circuit to position said printing means on said chart to a position representative of the measured value of the signal connected to the measuring circuit, oscillator means for producing skip trigger pulses at a frequency greater than the rate at which said measuring means and positioning system can jointly respond, means for conditioning said oscillator means to produce skip trigger pulses when said point selection address corresponds to the address of a point to be skipped, and means for gating said normal trigger pulses and said skip trigger pulses so that either is effective to advance the sequential point address signals to cause selected inputs to be omitted from the sequence being recorded without noticeable delay between the printing of the indicia identifying points in the recorded sequence.

9. A multipoint recorder as set forth in claim 8 which includes a randomly addressable visual display means responsive to said address signals for displaying a visual identification of said selected signals.

10. A multipoint chart recorder comprising:

a balanceable measuring circuit, a randomly addressable input switching means for selectively connecting each of a plurality of unknown signals to said measuring circuit, a randomly addressable printing means for selectively printing on said chart indicia identifying said unknown signals, a positioning system operable with the balancing of said measuring circuit to position said printing means along said chart to a balance position representative of the measured value of the unknown connected to the measuring circuit, timing means for periodically producing normal trigger pulses at a certain frequency, oscillator means for producing skip trigger pulses at a frequency greater than the rate at which said measuring and printing means can jointly respond, means for gating said normal trigger pulses and said skip trigger pulses so that both are effective to produce an actual point trigger pulse, means responsive to said actual trigger pulses for producing sequential coded address signals for identifying the unknown signal to be measured, means for transmitting said address signal simultaneously to both said addressable input switching means and said addressable printing means to effect in response to actual trigger pulses produced by normal trigger pulses a printing of indicia on the chart identifying the unknown signal being measured and indicating by its position on the chart its value, and means operable when said address signals correspond to an unknown signal to be skipped for jointly preventing the operation of selected input switch means and starting said oscillator means so that selected inputs can be omitted from the sequence recorded with no noticeable delay between the printing of the points in the recorded sequence.

11. The method for controlling the measurement and recording of the magnitude of a plurality of unknown signals in a multipoint recorder of the type utilizing a balanceable measuring system operable to position a printing element on a chart to a position representative of the magnitude of the unknown signal being measured and to then actuate said printing element to print at said position indicia representing said magnitude and identifying said unknown signal, comprising the steps of:

sequentially producing coded digital address signals identifying the unknown signals to be measured, automatically connecting in response to said digital address signals the unknown signals identified by the address signals, and automatically actuating in response to said digital address signals the printing element after said measuring system has positioned said printing element to a position on said chart corresponding to the magnitude of the addressed unknown signal so as to print indicia identifying the addressed unknown signal.

* * * * *